United States Patent
Buttgenbach

(10) Patent No.: US 11,721,982 B1
(45) Date of Patent: Aug. 8, 2023

(54) COUNTER-SOLAR POWER PLANT

(71) Applicant: 8ME NOVA, LLC, San Francisco, CA (US)

(72) Inventor: Thomas Buttgenbach, Santa Monica, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 0 days.

(21) Appl. No.: 17/873,489

(22) Filed: Jul. 26, 2022

(51) Int. Cl.
*H02J 3/46* (2006.01)

(52) U.S. Cl.
CPC .................................. *H02J 3/466* (2020.01)

(58) Field of Classification Search
CPC .......... H02J 3/381; H02J 2300/24; H02J 3/32; H02J 7/35; H02J 2300/20; H02J 2300/28; H02J 2300/22; H02J 2300/26; H02J 2300/40; H02J 3/004; H02J 3/38; H02J 7/0068; H02J 2310/64; H02J 3/48; H02J 2207/40; H02J 2310/12; H02J 2310/48; H02J 2310/60; H02J 7/00; H02J 4/00; H02J 3/472; H02J 3/466; H02J 3/46; H02J 3/00
See application file for complete search history.

(56) References Cited

U.S. PATENT DOCUMENTS

| | | | |
|---|---|---|---|
| 11,031,781 B1 * | 6/2021 | Zanone | H02J 3/007 |
| 2011/0276269 A1 | 11/2011 | Hummel | |
| 2012/0249065 A1 | 10/2012 | Bissonette et al. | |
| 2014/0200723 A1 | 7/2014 | Roy et al. | |
| 2016/0124400 A1 | 5/2016 | Kanayama et al. | |
| 2017/0047742 A1 | 2/2017 | Narla | |
| 2017/0104337 A1 | 4/2017 | Drees | |
| 2018/0331543 A1 * | 11/2018 | Palombini | H02J 3/381 |
| 2019/0079473 A1 * | 3/2019 | Kumar | G06Q 40/12 |
| 2020/0005405 A1 | 1/2020 | Cui et al. | |
| 2020/0021236 A1 | 1/2020 | Pan et al. | |
| 2020/0259358 A1 | 8/2020 | Hansen et al. | |
| 2022/0052525 A1 | 2/2022 | Buttgenbach et al. | |
| 2022/0299424 A1 | 9/2022 | Al-Muaili et al. | |

FOREIGN PATENT DOCUMENTS

| | | |
|---|---|---|
| EP | 3 796 506 A1 | 3/2021 |
| JP | 6017715 B1 | 11/2016 |

* cited by examiner

*Primary Examiner* — Elim Ortiz
(74) *Attorney, Agent, or Firm* — Foley & Lardner LLP

(57) ABSTRACT

A counter-solar power plant may include a controller configured to execute instructions stored in a memory, the instructions including operations to receive data associated with power outputs of a plurality of legacy solar-only resources (LSORs), determine an estimated power output of the plurality of LSORs based on the received data, obtain a target power delivery profile of the plurality of LSORs, the target power delivery profile including a plurality of target power outputs, determine an output of a CSPP renewable energy system (RES) and a charge/discharge of a CSPP energy storage system (ESS) such that a combined output of the CSPP and the estimated power output of the plurality of LSORs satisfies at least one of the plurality of target power outputs of the target power delivery profile, and control the CSPP RES and CSPP ESS according to the determined CSPP RES output and CSPP ESS charge/discharge.

19 Claims, 14 Drawing Sheets

COUNTER-SOLAR POWER PLANT

BACKGROUND

A legacy solar-only resource (LSOR) produces power using a solar array and provides this power for use either locally or on a grid. An LSOR outputs power dependent upon solar irradiance, resulting in high output in the middle of the day, low output in the morning and evening, and no output at night. Solar irradiance also varies due to weather and cloud patterns. Areas with many LSORs have the issue that compensating for variation in solar power output may require ramping output from other sources, such as fossil fuel power plants, up or down very quickly. The speed of the ramp-up or ramp-down may be greater than was envisaged when the fossil fuel plants were designed, resulting in reduced fuel efficiency, increased emissions, increased maintenance requirements, and shorter useful lifetimes for the fossil fuel plants.

SUMMARY

Aspects of the present disclosure relate to a counter-solar power plant (CSPP) including a controller configured to execute instructions stored in a memory, the instructions including operations including: receive data associated with a power output of a legacy solar-only resource (LSOR), determine an estimated power output of the LSOR based on the received data, and obtain a target power delivery profile including a plurality of target power outputs each indicating a target amount of power for the LSOR and the CSPP to deliver at different times of a time period. The operations may also include: determine an output of a CSPP renewable energy system (RES) and a charge/discharge of a CSPP energy storage system (ESS) such that a combined output of the CSPP and the estimated power output of the LSOR best satisfies at least one of the plurality of target power outputs of the target power delivery profile throughout the time period, and during the time period, adjusting an RES setpoint of an RES inverter coupled to the CSPP RES and an ESS setpoint of an ESS inverter coupled to the CSPP ESS to achieve the determined CSPP RES output and CSPP ESS charge/discharge.

Receiving the data associated with the power output of the LSOR may include receiving the data at different times during the time period, and determining the estimated power output of the LSOR may include determining the estimated power output at each of the different times based on the received data.

The CSPP may include a plurality of LSORs, and the data associated with the power outputs of the plurality of LSORs may include outputs measured by a real-time metering system at each LSOR of the plurality of LSORs, where the controller is configured to aggregate the measured outputs to calculate the estimated power output of the plurality of LSORs.

The CSPP may include a plurality of LSORs, and the data associated with the power outputs of the plurality of LSORs may include irradiance data collected near the plurality of LSORs, and the controller may be configured to calculate an expected power output for each LSOR of the plurality of LSORs based on the irradiance data, and aggregate the expected power output for each LSOR to determine the estimated power output of the plurality of LSORs.

The controller of the CSPP may be configured to calculate the expected power output for each respective LSOR of the plurality of LSORs based on the irradiance data by calculating an irradiance for each respective LSOR of the plurality of LSORs using the irradiance data and calculating the expected output for each respective LSOR based on a conversion efficiency of the respective LSOR.

The CSPP may include a plurality of LSORs, and the data associated with the power outputs of the plurality of LSORs may include historic output data of the plurality of LSORs. The controller may be configured to calculate an expected power output for each LSOR of the plurality of LSORs based on the historic output data and aggregate the expected power output for each LSOR to determine the estimated power output of the plurality of LSORs.

The controller of the CSPP may be configured to calculate the expected power output for each LSOR of the plurality of LSORs based on the historic output data by comparing current parameters of each of the LSORs to past parameters associated with the historic output data and generating a similarity score for each set of past parameters based on similarity to the current parameters of each LSOR, matching sets of past parameters to the current parameters based on the sets of past parameters satisfying a similarity threshold, and setting the expected power output for each LSOR to a past power output associated with the matching set of past parameters.

The CSPP may include a plurality of LSORs, and the data associated with the power outputs of the plurality of LSORs may include outputs measured at a subset of the plurality of LSORs that each include a real-time metering system. The controller may be configured to compare characteristics of the subset of the plurality of LSORs to each of the plurality of LSORs not of the subset that do not include a real-time metering system and calculate outputs for each of the plurality of LSORs not of the subset based on the compared characteristics. The controller may be configured to calculate the estimated power output of the plurality of LSORs using the measured outputs of the subset and the calculated outputs of the plurality of LSORs not of the subset.

The CSPP may be connected to an interconnection infrastructure of the LSOR.

The CSPP may include a CSPP ESS having a power capacity equal to or greater than the plurality of target power outputs of the target power delivery profile.

The CSPP may include a plurality of RESs and a plurality of ESSs. The controller may be configured to adjust RES setpoints of the plurality of RESs and ESS setpoints of the plurality of ESSs to achieve an aggregate CSPP RES output equal to the determined CSPP RES output and an aggregate CSPP ESS output equal to the determined CSPP ESS charge/discharge.

Aspects of the present disclosure may relate to a method including receiving, by a controller executing instructions stored in a memory, data associated with power outputs of a legacy solar-only resource (LSOR), determining, by the controller, an estimated power output of the LSOR based on the received data, and obtaining, by the controller, a target power delivery profile. The target power delivery profile may include a plurality of target power outputs to deliver at different times of a time period. The method may also include determining, by the controller, an output of a counter-solar power plant (CSPP) renewable energy system (RES) and a charge/discharge of a CSPP energy storage system (ESS) such that a combined output of the CSPP and the LSOR satisfies at least one of the plurality of target power outputs of the target power delivery profile throughout the time period, and during the time period, adjusting, by the controller, an RES setpoint of an RES inverter coupled to the CSPP RES and an ESS setpoint of an ESS inverter coupled to the CSPP ESS to achieve the determined CSPP RES output and CSPP ESS charge/discharge.

Within the method, the step of receiving the data associated with the power output of the LSOR may include receiving the data at different times the during the time period, and the step of determining the estimated power output of the LSOR may include determining the estimated power output at each of the different times based on the received data.

The method may be performed with a plurality of LSORs, and the data associated with the power outputs of the plurality of LSORs may include outputs measured by a real-time metering system at each LSOR of the plurality of LSORs, where the controller is configured to aggregate the measured outputs to calculate the estimated power output of the plurality of LSORs.

The method may be performed with a plurality of LSORs, and the data associated with the power outputs of the plurality of LSORs may include irradiance data collected near the plurality of LSORs. The method may further include calculating an expected power output for each LSOR of the plurality of LSORs based on the irradiance data and aggregating the expected power output for each LSOR to determine the estimated power output of the plurality of LSORs.

Within the method, the step of calculating the expected power output for each LSOR of the plurality of LSORs based on the irradiance data may include calculating an irradiance for each LSOR of the plurality of LSORs using the irradiance data and calculating the expected power output for each LSOR using the irradiance for each LSOR and a conversion efficiency of each LSOR.

The method may be performed with a plurality of LSORs, and the data associated with the power outputs of the plurality of LSORs may include historic output data of the plurality of LSORs. The method may further include calculating an expected power output for each LSOR of the plurality of LSORs based on the historic output data and aggregating the expected power output for each LSOR to determine the estimated power output of the plurality of LSORs.

Within the method, the step of calculating the expected power output for each LSOR of the plurality of LSORs based on the historic output data may include comparing current parameters of each LSOR of the plurality of LSORs to past parameters associated with the historic output data and generating a similarity score for each set of past parameters based on similarity to the current parameters of each LSOR, matching a set of past parameters to the current parameters based on the set of past parameters satisfying a similarity threshold, and setting the expected power output for each LSOR to a past power output associated with the matching set of past parameters.

WM The method may be performed with a plurality of LSORs, and the data associated with the power outputs of the plurality of LSORs may include outputs measured at a subset of the plurality of LSORs that each include a real-time metering system. The method may further include comparing characteristics of the subset of the plurality of LSORs to each of the plurality of LSORs not of the subset that do not include a real-time metering system, calculating outputs for each of the plurality of LSORs not of the subset based on the compared characteristics, and calculating the estimated power output of the plurality of LSORs using the measured outputs of the subset and the calculated outputs of the plurality of LSORs not of the subset.

Aspects of the present disclosure may relate to a non-transitory computer readable medium including instructions that, when executed by a processor, cause the processor to receive data associated with a power output of a legacy solar-only resource (LSOR), determine an estimated power output of the LSOR based on the received data, and obtain a target power delivery profile of the LSOR, the target power delivery profile including a plurality of target power outputs to deliver at different times of a time period. The processor may also determine an output of a counter-solar power plant (CSPP) renewable energy system (RES) and a charge/discharge of a CSPP energy storage system (ESS) such that a combined output of the CSPP and the LSOR satisfies at least one of the plurality of target power outputs of the target power delivery profile throughout the time period, and during the time period, the processor may adjust an RES setpoint of an RES inverter coupled to the CSPP RES and an ESS setpoint of an ESS inverter coupled to the CSPP ESS to achieve the determined CSPP RES output and CSPP ESS charge/discharge.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure solve the technical problem of smoothing the output of a legacy solar-only resource (LSOR). An LSOR has a "peaky" power output profile, meaning that an LSOR output rises sharply as the sun rises, peaks around noon, and falls sharply as the sun sets. This power output profile does not match power usage patterns, so the LSOR output is supplemented by other power sources. In the case of the LSOR being connected to the grid, fossil fuel plants are used to supplement the LSOR output. The fossil fuel plants, however, may not be not designed to ramp up output or ramp down output as rapidly as needed to counteract the rapid ramp-downs and ramp-ups of an LSOR. This may result in reduced fuel efficiency, increased emissions, increased maintenance requirements, and shorter useful lifetimes for the fossil fuel plants. An advantage of a counter-solar power plant (CSPP) is that it produces power to complement the LSOR output, counteracting the rise and fall of the LSOR output. Thus, a combined CSPP-LSOR output has much less variability than the LSOR output. The smooth, consistent CSPP-LSOR output is also achieved without resorting to fossil fuel power plants, resulting in less emissions.

The use of a CSPP also solves the technical problem of excess power production in the middle of the day when solar output is highest. Adding additional solar resources serves to increase solar output in the morning and evening, but due to the peaky nature of solar output, more power than is needed is produced in the middle of the day. Adding a CSPP instead of additional solar solves the problem of having not enough power in the morning and the evening and having too much power in the middle of the day, resulting in curtailed power in the middle of the day. A CSPP has a complementary output to that of an LSOR, so power is added where it is needed most and not added where it is not needed, resulting in curtailing less power.

Figure 1:
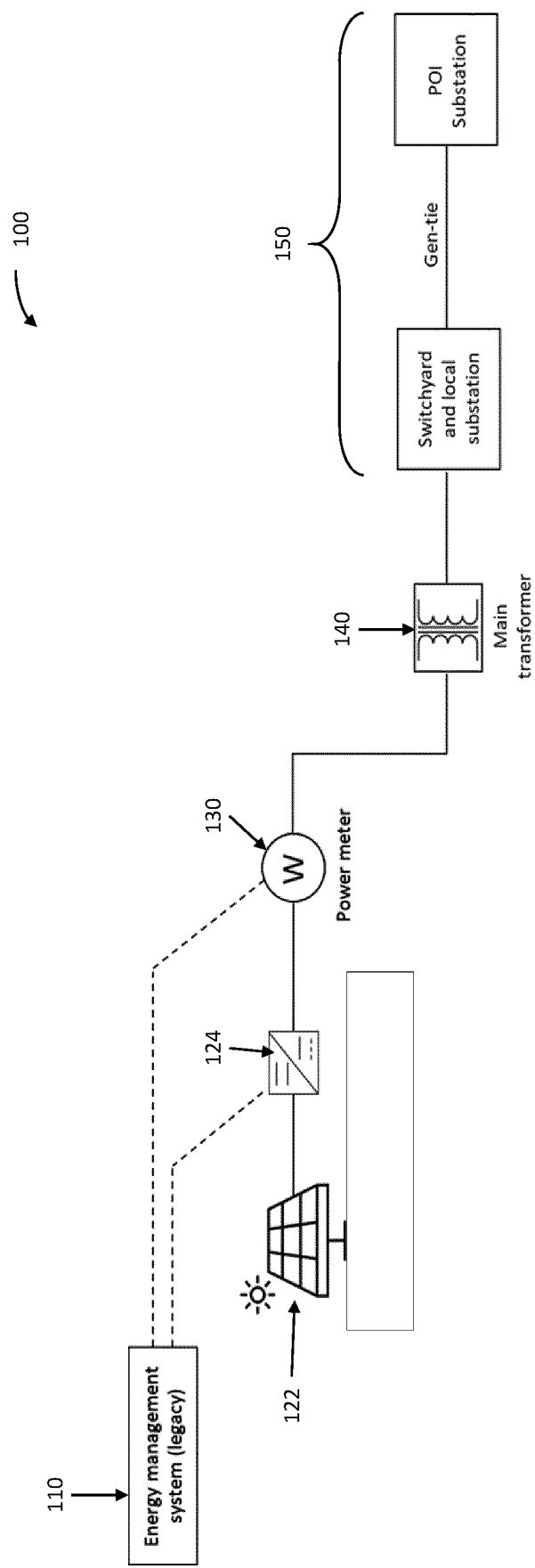
FIG. 1 is an example legacy solar-only resource (LSOR), in accordance with one or more embodiments.

FIG. 1 is an example legacy solar-only power plant (LSOR) 100, in accordance with one or more embodiments. The LSOR may include a legacy energy management system (LEMS) 110. The LEMS 110 may be a controller. The LEMS 110 may send and receive signals from an inverter 124 and a power meter 130. The LSOR may include a renewable energy source (RES) 122. The RES 122 may be a solar array. The inverter 124 may convert DC power from the RES 122 to AC power. The inverter 124 may regulate an output of the RES 122 to control an LSOR output. The LEMS 110 may control the LSOR inverter 224 to control the LSOR output. The LEMS 110 may transmit setpoints to the LSOR inverter 224. The setpoints may be voltage setpoints, current setpoints, or real and/or reactive power setpoints. A setpoint is a command to an inverter to generate an output specified in the setpoint. The LSOR power meter 130 may provide feedback to the LEMS 210 for controlling the LSOR output.

The LSOR may include a transformer 140, and an interconnection infrastructure 150. The interconnection infrastructure may include a switchyard and local substation, a gen-tie, and a point-of-interconnect (POI) substation. The POI substation may connect to a grid, such as a utility grid. The transformer 140 may step up a voltage of the LSOR output for transmitting power through the interconnection infrastructure to the grid.

The LSOR may have a power output profile which shows how the LSOR output changes over an interval. The LSOR power output profile may be an average of the LSOR output for a plurality of intervals, a representative interval from the plurality of intervals, or a weighted average of the plurality of intervals. For example, the LSOR power output profile may show how the LSOR output changes over the course of a day. If the RES 122 is a solar array, the LSOR power output profile may show the LSOR output rise in the morning as the LSOR is exposed to more sunlight, peak at noon, and drop off through the afternoon and evening as the sun sets. In some embodiments, a peak LSOR output may be limited by a transmission capacity of the interconnection infrastructure 150. In other embodiments, the transmission capacity of the interconnection infrastructure 150 may be based on the peak LSOR output. In some embodiments, the transmission capacity is no more than 150% of the peak LSOR output. The peak LSOR output is higher than an average LSOR output. The transmission capacity of the interconnection infrastructure 150 may be underutilized. For example, if the RES 122 is a solar array, the peak LSOR output at noon may be much higher than the LSOR output in the morning and in the evening, meaning the transmission capacity of the interconnection infrastructure 150 is only fully used at noon and only partially used in the morning and the evening.

Figure 2:
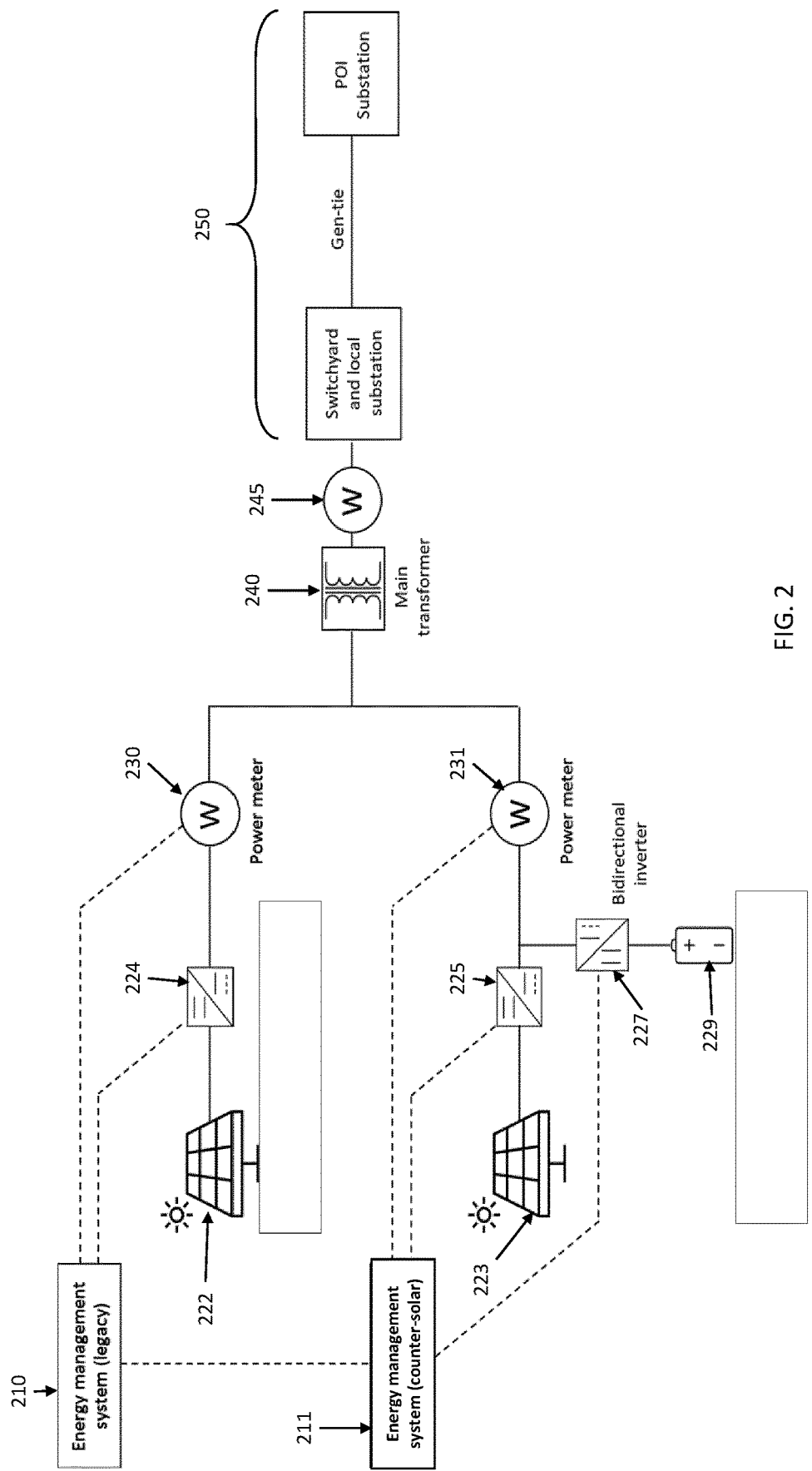
FIG. 2 is an example counter-solar power plant (CSPP) connected to an interconnection infrastructure of an LSOR upstream of a transformer of the LSOR, in accordance with one or more embodiments.

FIG. 2 is an example counter-solar power plant (CSPP) connected to an LSOR interconnection infrastructure 250 upstream of an LSOR transformer 240, in accordance with one or more embodiments.

The LSOR may be the LSOR of FIG. 1. The LSOR may include a legacy energy management system (LEMS) 210. The LEMS 210 may be or include a controller. The LEMS 210 may send and receive signals from an LSOR inverter 224 and an LSOR power meter 230.

The LSOR may include an LSOR renewable energy source (RES) 222. The LSOR RES 222 may be a solar array. The LSOR may include a transformer 240, an interconnection infrastructure power meter 245, and an LSOR interconnection infrastructure 250. In some embodiments, the interconnection infrastructure power meter 245 may be in a gen-tie of the interconnection infrastructure. The interconnection infrastructure power meter 245 may be added to the LSOR interconnection infrastructure 250 when the CSPP is connected to the LSOR interconnection infrastructure 250. The LSOR interconnection infrastructure 250 may include a switchyard and local substation, the gen-tie, and a POI substation.

The LEMS 210 may control the LSOR inverter 224 to regulate an LSOR output. The LEMS 210 may transmit LSOR inverter setpoints to the LSOR inverter 224. The LSOR inverter setpoints may be voltage setpoints, current setpoints, or power setpoints. The LSOR power meter 230 may provide feedback to the LEMS 210 for controlling the LSOR output. The LSOR inverter 224 may convert DC power from the LSOR RES 222 to AC power.

The CSPP may include a counter-solar energy management system (CEMS) 211. The CEMS 211 may be a controller. The CEMS may send and receive signals from an RES inverter 225, a CSPP power meter 231, and an energy storage system (ESS) inverter 227. The CEMS 211 may send and receive signals from the LEMS 210. The signals from the LEMS 210 may include LSOR inverter setpoints for the LSOR inverter 224 and the LSOR power output, or an indication of the LSOR power output, as measured by the LSOR power meter 230. The CEMS 211 may transmit RES inverter setpoints to the RES inverter 225. The RES inverter setpoints may be voltage setpoints, current setpoints, or power setpoints. The CEMS may transmit ESS inverter setpoints to the ESS inverter 227. The ESS inverter setpoints may be voltage setpoints, current setpoints, or power setpoints. The ESS inverter 227 may be a bidirectional inverter. The CSPP may include an energy storage system (ESS) 229. The CSPP may include a CSPP RES 223. The CSPP RES 223 may be a solar array, wind farm, or any other type of RES. The ESS 229 may be a battery energy storage system or any other type of energy storage system.

The ESS 229 may be charged using power received from the CSPP RES 223. The ESS 229 may discharge to provide power to the transformer 240 through the CSPP power meter 231. The ESS inverter 227 may be configured to regulate a charge/discharge of the ESS 229. The ESS inverter 227 may convert AC power from the RES inverter 225 to DC power to charge the ESS 229. The ESS inverter 227 may convert DC power from the ESS 229 to AC power to be sent to the transformer 240. The CEMS 211 may control the RES inverter 225 and the ESS inverter 227 to regulate how much power is generated by the CSPP RES 223 and how much power is charged to the ESS 229 or discharged from the ESS 229 in order to control a CSPP output. The CEMS 211 may control the RES inverter 225 and the ESS 227 by adjusting setpoints of the RES inverter 225 and the ESS 227. The CSPP power meter 231 may measure the CSPP output and provide feedback to the CEMS 211 for controlling the CSPP output. The feedback to the CEMS 211 may be used to control the CSPP output in a closed-loop control system such that the measured output power of the CSPP is equal to the lesser of a power level based on a power sale agreement or on profitability based on current and expected market pricing for energy, or the difference between the transmission capacity and the LSOR output.

The combined LSOR output and CSPP output may be received by the transformer 240. The transformer 240 may step up the combined output for transmission through the LSOR interconnection infrastructure 250. The interconnection infrastructure power meter 245 may measure an amount of power transmitted through the LSOR interconnection infrastructure 250.

The LSOR may have a power output profile which shows how the LSOR output changes over a time period. For example, the LSOR power output profile may show how the LSOR output changes over the course of a day. If the LSOR RES 222 is a solar array, the LSOR power output profile may show the LSOR output rise in the morning as the LSOR is exposed to more sunlight, peak at noon, and drop off through the afternoon and evening as the sun sets. In some embodiments, a peak LSOR output may be limited by a transmission capacity of the LSOR interconnection infrastructure 250. In other embodiments, the transmission capacity of the LSOR interconnection infrastructure 250 may be based on the peak LSOR output. In some embodiments, the transmission capacity is no more than 150% of the peak LSOR output. The peak LSOR output is higher than an average LSOR output. The transmission capacity of the LSOR interconnection infrastructure 250 may be underutilized. For example, if the RES 122 is a solar array, the peak LSOR output at noon may be much higher than the LSOR output in the morning and in the evening, meaning the transmission capacity of the LSOR interconnection infrastructure 250 is only fully used at noon and only partially used in the morning and the evening.

In some embodiments, an output capacity of the CSPP RES 223 may be sized based on an LSOR transmission capacity of the LSOR interconnection infrastructure. In some embodiments, the CSPP RES output capacity may be sized to be equal to the LSOR interconnection infrastructure transmission capacity. In other embodiments, the CSPP RES output capacity may be sized such that the CSPP RES 223 may output sufficient power to fully utilize the LSOR transmission capacity. In yet other embodiments, the CSPP RES output capacity may be sized such that the CSPP RES 223 may output sufficient power, when combined with the LSOR RES output and the ESS output, to fully utilize the LSOR transmission capacity. The CSPP RES output capacity may be sized such that the CSPP RES 223 may output sufficient power, when combined with the LSOR RES output and the ESS output, to complement the LSOR power output profile to fully utilize the LSOR transmission capacity.

A storage capacity of the ESS 229 may be based on the interconnection infrastructure transmission capacity and the LSOR power output profile. For example, the CSPP RES output capacity may be sized and the ESS storage capacity may be sized such that the CSPP RES 223 outputs sufficient power and the ESS 229 stores and/or outputs sufficient power to complement the LSOR power output profile to fully utilize the LSOR transmission capacity. In another example, The CSPP RES output capacity may be sized and the ESS storage capacity may be sized such that the CSPP RES 223 outputs sufficient power to complement the LSOR power output profile and charge the ESS 229 so the ESS 229 can output sufficient power to complement the LSOR power output profile to fully utilize the LSOR transmission capacity. The ESS storage capacity is sized to be able to store the CSPP RES output and provide stored power to complement the LSOR power output profile to fully utilize the LSOR transmission capacity. In this example, the CSPP RES 223 may output sufficient power to complement the LSOR power output profile to fully utilize the LSOR transmission capacity and charge the ESS with sufficient power such that when the CSPP RES 223 does not output sufficient power to complement the LSOR power output profile, the ESS 229 may output sufficient power to complement the LSOR power output. In this example, the CSPP RES 223 may be a solar array which produces power during daylight hours and charges the ESS 229. Before and after daylight hours when the CSPP RES 223 is not producing power, the ESS 229 may provide stored power to complement the LSOR power output profile.

In some embodiments, the CSPP RES 223 and ESS 229 are sized together based on the LSOR transmission capacity and the LSOR power output profile. The CSPP RES 223 and ESS 229 may be sized such that a CSPP-LSOR combined power output is substantially equal to the LSOR transmission capacity for a target interval. The target interval may be based on the LSOR power output profile. For example, the LSOR power output profile may show the LSOR power output for a day. The target interval may be a portion of the day or the entire day, in which case the CSPP-LSOR combined power output may always be substantially equal to the LSOR transmission capacity. The CSPP RES 223 may be sized to produce an amount of power equal to the LSOR transmission capacity for the target interval minus an amount of power produced by the LSOR RES 222 as shown in the LSOR power output profile. The ESS 229 may be sized to store power generated by the CSPP RES 223 and output the stored power such that the CSPP-LSOR combined output is substantially equal to the LSOR transmission capacity.

In some embodiments, the CEMS 221 is configured to control the CSPP output such that a variability of the CSPP-LSOR combined output has a lower variability than a variability of the LSOR output. Variability of an output is a measure of how much individual values of the output differ from a moving average of the output or from an expected pattern. In the case of variability of the LSOR output, the pattern may be the LSOR power output profile based on historic LSOR outputs. The pattern may be a pattern of how the LSOR output changes through a day. The CEMS 211 may control the CSPP RES output and the ESS charge/discharge to control the CSPP output. The CEMS 211 may track the CSPP power output using the CSPP power meter 231 and track the LSOR power output using the LSOR power meter 230. In some embodiments, the CSPP power meter 231 and the LSOR power meter 230 continuously transmit an instantaneous CSPP output and instantaneous LSOR output to the CEMS 211. In other embodiments, the CEMS 211 polls the CSPP power meter 231 and the LSOR power meter 230 at periodic intervals for the instantaneous CSPP output and the instantaneous LSOR output. In yet other embodiments, the CEMS 211 polls the CSPP power meter 231 and the LSOR power meter 230 at periodic intervals for a moving average of the CSPP output and a moving average of the LSOR output. The variability of the LSOR output may be determined in real-time and/or based on the LSOR power output profile. In some embodiments, the variability of the LSOR output may be determined by comparing measured LSOR output values to the LSOR power output profile based on historic LSOR outputs. In other embodiments, the variability of the LSOR output may be determined by comparing measured LSOR output values to a moving average of measured LSOR output values. In yet other embodiments, the variability of the LSOR output may be determined by comparing measured LSOR output values to a set of ideal LSOR output values. The set of ideal LSOR output values may be determined based on a representative or ideal irradiance values and the conversion efficiency of the LSOR. The set of ideal LSOR output values may be equal to the LSOR power output profile. The CEMS 211 may regulate the CSPP output and/or the ESS charge/discharge based on the variability of the LSOR output such that the CSPP-LSOR combined output has a lower variability than a variability of the LSOR output. By lowering the variability of the CSPP-LSOR combined output, the CSPP functions as a firming plant for the LSOR.

In some embodiments, the CEMS 211 is configured to control the CSPP output such that the CSPP-LSOR combined output does not exceed the LSOR transmission capacity. The LSOR output and/or the CSPP-LSOR output may be determined in real time. The CEMS 211 may regulate the CSPP output and/or the ESS charge/discharge based on the LSOR output such that the CSPP-LSOR combined output does not exceed the LSOR transmission capacity. The CEMS 211 may track the CSPP power output using the CSPP power meter 231 and track the LSOR power output using the LSOR power meter 230. The CEMS 211 may track the CSPP-LSOR combined power output using the interconnection infrastructure power meter 245. The CEMS 211 may control the CSPP such that an instantaneous sum of the CSPP output, as measured at the CSPP power meter 331, and the LSOR output, as measured at the LSOR power meter 330, does not exceed a maximum permitted power flow at the point-of-interconnect (POI) to the grid. The CEMS 211 may control the CSPP output according to a power sale agreement and/or based on current and expected market pricing for power while ensuring that the CSPP-LSOR combined output does not exceed the LSOR transmission capacity. In some embodiments, the CEMS 211 may control the CSPP such that a rate of change of the CSPP-LSOR combined power output does not exceed an allowed rate of change at the POI. The CEMS 211 may calculate a rate of change of the CSPP-LSOR output as change in the CSPP-LSOR output over time. The CEMS 211 may compare the rate of change of the CSPP-LSOR output and compare it to a maximum ramp-down rate (e.g., a stored maximum ramp-down rate) and a maximum ramp-up rate (e.g., a stored maximum ramp-up rate) of the POI. The CEMS 211 may control the CSPP output such that a ramp-down rate of the CSPP-LSOR combined power output does not exceed the maximum ramp-down rate and that a ramp-up rate of the CSPP-LSOR combined power output does not exceed the maximum ramp-up rate. Avoiding exceeding the maximum ramp-down and ramp-up rates of the POI avoids causing harm to the grid and violating agreements with the utility organization operating the grid.

In some embodiments, the CEMS 211 and the LEMS 210 may transmit inverter setpoints of the CSPP and the LSOR to a shared energy management system. The shared energy management system may resolve conflicts arising from independently set inverter setpoints of the CSPP and the LSOR. If the sum of the CSPP output and the LSOR output exceeds the LSOR interconnection infrastructure transmission capacity, the shared energy management system may send a signal to the CEMS 211 to reduce the CSPP output. The inverter setpoints of the CSPP and the LSOR may be sent to the shared energy management system for approval by the CEMS 211 and the LEMS 210 before being applied to inverters of the CSPP and the LSOR. The shared energy management system may compare the CSPP output and the LSOR output such that the CSPP output complements the LSOR output. The shared energy management system may receive inverter setpoints of the CSPP and the LSOR, calculate a combined output based on the received inverter setpoints, compare the combined output to a target output, and adjust the inverter setpoints of the CSPP so the combined output is equal to the target output. The shared energy management system may determine inverter setpoints for inverters of the CSPP and the LSOR based on the transmission capacity, an instantaneous LSOR output, and an instantaneous CSPP output. The shared energy management system may set the CSPP output to be equal to the transmission capacity minus the LSOR output. The shared energy management system controls the CSPP output such that the CSPP output does not exceed the transmission capacity minus the LSOR output.

Figure 3:
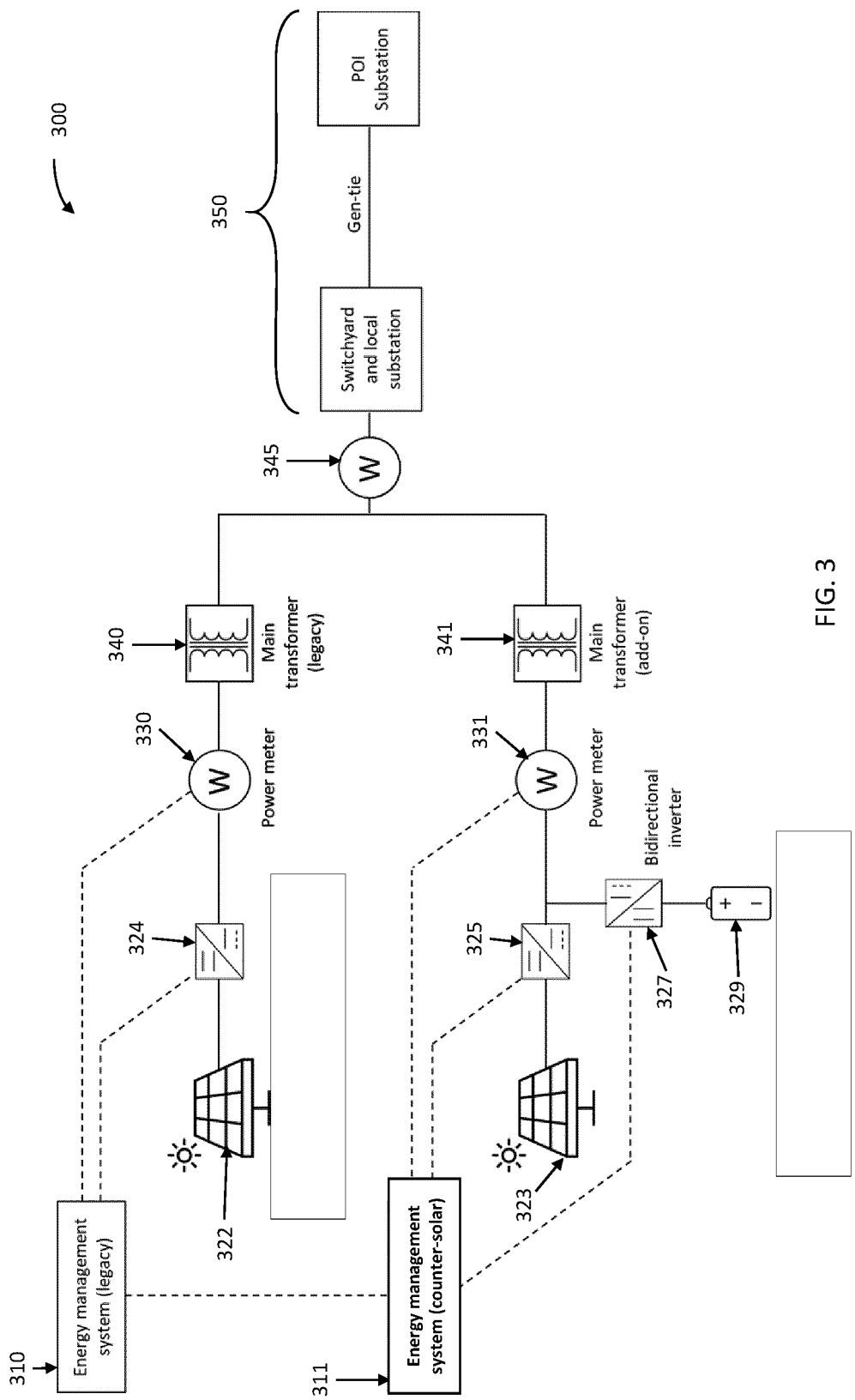
FIG. 3 is an example counter-solar power plant (CSPP) connected to an interconnection infrastructure of an LSOR downstream of a transformer of the interconnection infrastructure, in accordance with one or more embodiments.

FIG. 3 is an example counter-solar power plant (CSPP) connected to an interconnection infrastructure of an LSOR downstream of an LSOR transformer 340, in accordance with one or more embodiments.

The LSOR may include a legacy energy management system (LEMS) 310. The LEMS 310 may be a controller. The LEMS 310 may send and receive signals from an LSOR inverter 324 and an LSOR power meter 330. The LSOR may include an LSOR renewable energy source (RES) 322. The LSOR RES 322 may be a solar array. The LSOR may include an LSOR RES inverter 324. The LEMS 310 may adjust setpoints of the LSOR RES inverter 324 to control an LSOR RES output. A setpoint is a command to an inverter to generate an output specified in the setpoint. The LSOR may include an LSOR transformer 340, an interconnection infrastructure power meter 345, and an LSOR interconnection infrastructure 350. In some embodiments, the interconnection infrastructure power meter 345 may be in a gen-tie of the interconnection infrastructure. The interconnection infrastructure power meter 345 may be added to the LSOR interconnection infrastructure 350 when the CSPP is connected to the LSOR interconnection infrastructure 350. The LSOR interconnection infrastructure 350 may include a switchyard and local substation, the gen-tie, and a POI substation.

The CSPP may include a counter-solar energy management system (CEMS) 311. The CEMS 311 may be a controller. The CEMS may send and receive signals from an RES inverter 325, a CSPP power meter 331, and an energy storage system (ESS) inverter 327. The CEMS 311 may send and receive signals from the LEMS 310. The signals from the LEMS 310 may include LSOR inverter setpoints for the LSOR inverter 324 and the LSOR power output, or an indication of the LSOR power output, as measured by the LSOR power meter 330. The CEMS 311 may transmit RES inverter setpoints to the CSPP RES inverter 325. The RES inverter setpoints may be voltage setpoints, current setpoints, or power setpoints. The CEMS may transmit ESS inverter setpoints to the ESS inverter 327. The ESS inverter setpoints may be voltage setpoints, current setpoints, or power setpoints. The ESS inverter 327 may be a bidirectional inverter. The CSPP may include an energy storage system (ESS) 329. The CSPP may include a CSPP RES 323. The CSPP RES 323 may be a solar array, wind farm, or any other type of RES. The ESS 229 may be a battery energy storage system or any other type of energy storage system.

The LEMS 310 may control the LSOR inverter 324 to regulate an LSOR output. The LEMS 310 may transmit LSOR inverter setpoints to the LSOR inverter 324. The LSOR inverter setpoints may be voltage setpoints, current setpoints, or power setpoints. The LSOR power meter 330 may provide feedback to the LEMS 310 for controlling the LSOR output. The LSOR inverter 324 may convert DC power from the LSOR RES 322 to AC power. The LSOR transformer 340 may step up the LSOR output for transmission through the LSOR interconnection infrastructure 350. The interconnection infrastructure power meter 345 may measure an amount of power transmitted through the LSOR interconnection infrastructure 350.

The ESS 329 may be charged using power received from the CSPP RES 323. The ESS 329 may discharge to provide power to the CSPP transformer 341 through the CSPP power meter 331. The ESS inverter 327 may be configured to regulate a charge/discharge of the ESS 329. The ESS inverter 327 may convert AC power from the CSPP RES inverter 325 to DC power to charge the ESS 329. The ESS inverter 327 may convert DC power from the ESS 329 to AC power to be sent to the CSPP transformer 341. The CEMS 311 may control the CSPP RES inverter 325 and the ESS inverter 327 to regulate how much power is generated by the CSPP RES 323 and how much power is charged to the ESS 329 or discharged from the ESS 329 in order to control a CSPP output. The CSPP power meter 331 may measure the CSPP output and provide feedback to the CEMS 311 for controlling the CSPP output. The CSPP transformer 341 may step up the CSPP output for transmission through the LSOR interconnection infrastructure 350. The interconnection infrastructure power meter 345 may measure an amount of power transmitted through the LSOR interconnection infrastructure 350. The feedback to the CEMS 311 may be used to control the CSPP output in a closed-loop control system such that the measured output power of the CSPP remains equal to the lesser of a power level based on a power sale agreement or on profitability based on current and expected market pricing for energy, or the difference between the transmission capacity and the LSOR output.

The LSOR may have a power output profile which shows how the LSOR output changes over a time period. For example, the LSOR power output profile may show how the LSOR output changes over the course of a day. If the LSOR RES 322 is a solar array, the LSOR power output profile may show the LSOR output rise in the morning as the LSOR is exposed to more sunlight, peak at noon, and drop off through the afternoon and evening as the sun sets. In some embodiments, a peak LSOR output may be limited by a transmission capacity of the LSOR interconnection infrastructure 350. In other embodiments, the transmission capacity of the LSOR interconnection infrastructure 350 may be based on the peak LSOR output. In some embodiments, the transmission capacity is no more than 150% of the peak LSOR output. The peak LSOR output is higher than an average LSOR output. The transmission capacity of the LSOR interconnection infrastructure 350 may be underutilized. For example, if the RES 132 is a solar array, the peak LSOR output at noon may be much higher than the LSOR output in the morning and in the evening, meaning the transmission capacity of the LSOR interconnection infrastructure 350 is only fully used at noon and only partially used in the morning and the evening.

In some embodiments, an output capacity of the CSPP RES 323 may be sized based on an LSOR transmission capacity of the LSOR interconnection infrastructure. In some embodiments, the CSPP RES output capacity may be sized to be equal to the LSOR interconnection infrastructure transmission capacity. In other embodiments, the CSPP RES output capacity may be sized such that the CSPP RES 323 may output sufficient power to fully utilize the LSOR transmission capacity. In yet other embodiments, the CSPP RES output capacity may be sized such that the CSPP RES 323 may output sufficient power, when combined with the LSOR RES output and the ESS output, to fully utilize the LSOR transmission capacity. The CSPP RES output capacity may be sized such that the CSPP RES 323 may output sufficient power, when combined with the LSOR RES output and the ESS output, to complement the LSOR power output profile to fully utilize the LSOR transmission capacity.

A storage capacity of the ESS 329 may be based on the interconnection infrastructure transmission capacity and the LSOR power output profile. For example, the CSPP RES output capacity may be sized and the ESS storage capacity may be sized such that the CSPP RES 323 outputs sufficient power and the ESS 329 stores and/or outputs sufficient power to complement the LSOR power output profile to fully utilize the LSOR transmission capacity. In another example, The CSPP RES output capacity may be sized and the ESS storage capacity may be sized such that the CSPP RES 323 outputs sufficient power to complement the LSOR power output profile and charge the ESS 329 so the ESS 329 can output sufficient power to complement the LSOR power output profile to fully utilize the LSOR transmission capacity. The ESS storage capacity is sized to be able to store the CSPP RES output and provide stored power to complement the LSOR power output profile to fully utilize the LSOR transmission capacity. In this example, the CSPP RES 323 may output sufficient power to complement the LSOR power output profile to fully utilize the LSOR transmission capacity and charge the ESS with sufficient power such that when the CSPP RES 323 does not output sufficient power to complement the LSOR power output profile, the ESS 329 may output sufficient power to complement the LSOR power output. In this example, the CSPP RES 323 may be a solar array which produces power during daylight hours and charges the ESS 329. Before and after daylight hours when the CSPP RES 323 is not producing power, the ESS 329 may provide stored power to complement the LSOR power output profile.

In some embodiments, the CSPP RES 323 and ESS 329 are sized together based on the LSOR transmission capacity and the LSOR power output profile. The CSPP RES 323 and ESS 329 may be sized such that a CSPP-LSOR combined power output is substantially equal to the LSOR transmission capacity for a target interval. The target interval may be based on the LSOR power output profile. For example, the LSOR power output profile may show the LSOR power output for a day. The target interval may be a portion of the day or the entire day, in which case the CSPP-LSOR combined power output will always be substantially equal to the LSOR transmission capacity. The CSPP RES 323 may be sized to produce an amount of power equal to the LSOR transmission capacity for the target interval minus an amount of power produced by the LSOR RES 322 as shown in the LSOR power output profile. The ESS 329 may be sized to store power generated by the CSPP RES 323 and output the stored power such that the CSPP-LSOR combined output is substantially equal to the LSOR transmission capacity.

In some embodiments, the CEMS 321 is configured to control the CSPP output such that a variability of the CSPP-LSOR combined output has a lower variability than a variability of the LSOR output. Variability of an output is a measure of how much individual values of the output differ from a moving average of the output or from a pattern associated with the output. The CEMS 321 may control the CSPP output to counteract the variability of the LSOR output. For example, if the LSOR is a solar array and clouds pass in front of the solar array causing a temporary drop in LSOR output, the CEMS 311 may raise the CSPP output to adjust for the temporary drop in LSOR output. With the increased CSPP output balancing out the temporary drop in LSOR output, the CSPP-LSOR combined output can remain steady and thus have less variability than the LSOR output.

The CEMS 311 may control the CSPP RES output and the ESS charge/discharge to control the CSPP output. The CEMS 311 may track the CSPP power output using the CSPP power meter 331 and track the LSOR power output using the LSOR power meter 330. The variability of the LSOR output may be determined in real-time by the LEMS 310 using the tracked LSOR power output from the LSOR power meter 330. In some embodiments, an expected variability of the LSOR output may be determined based on historic LSOR output data and/or the LSOR power output profile, where the LSOR power output profile is an representation of an average LSOR output. The CEMS 311 may regulate the CSPP output and/or the ESS charge/discharge based on the variability of the LSOR output such that the CSPP-LSOR combined output has a lower variability than a variability of the LSOR output. The CEMS 311 may adjust inverter setpoints for the CSPP RES inverter 325 and the ESS inverter 327 to control the CSPP RES 323 and the ESS 329. The CEMS 311 may receive feedback from the LSOR power meter 330 to determine the LSOR output variability and control the CSPP RES 323 and ESS 329 to counteract the LSOR output variability. The CEMS 311 may receive feedback from the interconnection infrastructure power meter 345 to monitor the CSPP-LSOR combined output variability.

In some embodiments, the CEMS 311 is configured to control the CSPP output such that the CSPP-LSOR combined output does not exceed the LSOR interconnection infrastructure transmission capacity. The LSOR output and/or the CSPP-LSOR output may be determined in real time. The CEMS 311 may regulate the CSPP output and/or the ESS charge/discharge based on the LSOR output such that the CSPP-LSOR combined output does not exceed the LSOR transmission capacity. The CEMS 311 may track the CSPP power output using the CSPP power meter 331 and track the LSOR power output using the LSOR power meter 330. The CEMS 311 may track the CSPP-LSOR combined power output using the interconnection infrastructure power meter 345. The CEMS 311 may control the CSPP such that the instantaneous sum of the CSPP output and the LSOR output does not exceed a maximum permitted power flow at the point-of-interconnect (POI) to the grid. The CEMS 311 may control the CSPP output according to a power sale agreement and/or based on current and expected market pricing for power while ensuring that the CSPP-LSOR combined output does not exceed the LSOR transmission capacity. In some embodiments, the CEMS 311 may control the CSPP such that a rate of change of the CSPP-LSOR combined power output does not exceed an allowed rate of change at the POI. The CEMS 311 may control the CSPP such that a ramp-down rate of the CSPP-LSOR combined power output does not exceed a maximum ramp-down rate and that a ramp-up rate of the CSPP-LSOR combined power output does not exceed a maximum ramp-up rate.

In some embodiments, the CEMS 311 and the LEMS 310 may transmit inverter setpoints of the CSPP and the LSOR to a shared energy management system. The shared energy management system may resolve conflicts arising from independently set inverter setpoints of the CSPP and the LSOR. If the sum of the CSPP output and the LSOR output exceeds the LSOR interconnection infrastructure transmission capacity, the shared energy management system may send a signal to the CEMS 311 to reduce the CSPP output. The inverter setpoints of the CSPP and the LSOR may be sent to the shared energy management system for approval by the CEMS 311 and the LEMS 310 before being applied to inverters of the CSPP and the LSOR. The shared energy management system may compare the CSPP output and the LSOR output such that the CSPP output complements the LSOR output. The shared energy management system may receive inverter setpoints of the CSPP and the LSOR, calculate a combined output based on the received inverter setpoints, compare the combined output to a target output, and adjust the inverter setpoints of the CSPP so the combined output is equal to the target output. The shared energy management system may determine inverter setpoints for inverters of the CSPP and the LSOR based on the transmission capacity, an instantaneous LSOR output, and an instantaneous CSPP output. The shared energy management system may set the CSPP output to be equal to the transmission capacity minus the LSOR output. The shared energy management system may control the CSPP such that the CSPP output does not exceed the transmission capacity minus the LSOR output.

Figure 4:
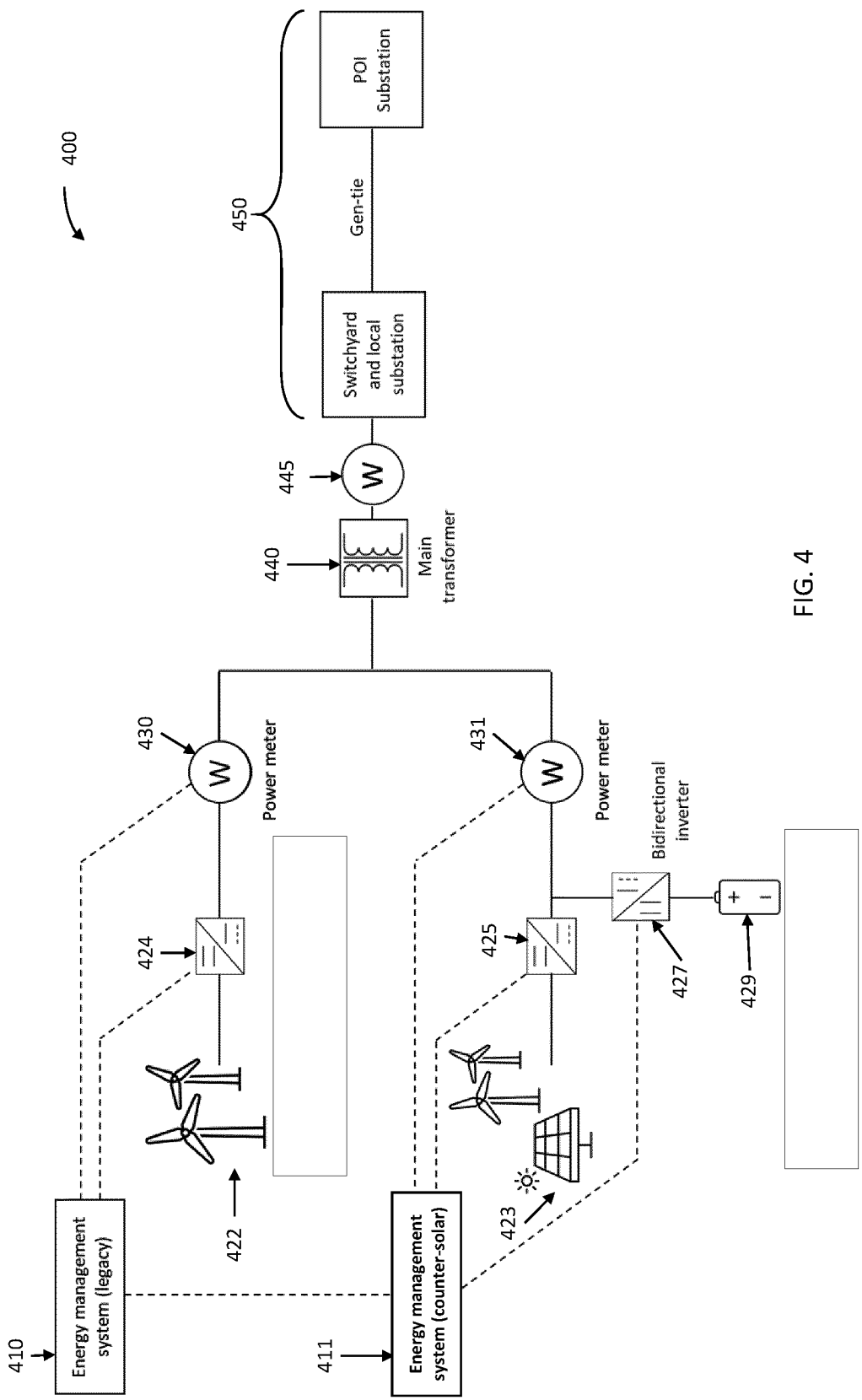
FIG. 4 is an example counter-solar power plant (CSPP) connected to an interconnection infrastructure of an LSOR upstream of a transformer of the interconnection infrastructure, where the CSPP is a wind farm, in accordance with one or more embodiments.

FIG. 4 is an example CSPP connected to an interconnection infrastructure of an LSOR upstream of a transformer of the interconnection infrastructure, where the CSPP is a wind farm, in accordance with one or more embodiments. FIG. 4 shows the example CSPP of FIG. 2, wherein the LSOR RES 422 is a wind farm and the CSPP RES is a combination wind/solar farm. Although FIG. 2 shows the LSOR RES 222 as a solar array and the CSPP RES 223 as a solar array, the LSOR RES 222 and CSPP RES 223 may be any RES, including, but not limited to, a wind farm, a solar farm, a geothermal plant, a biofuel plant, a tidal force generator, a hydroelectric generator, or any combination of RESs.

Figure 5:
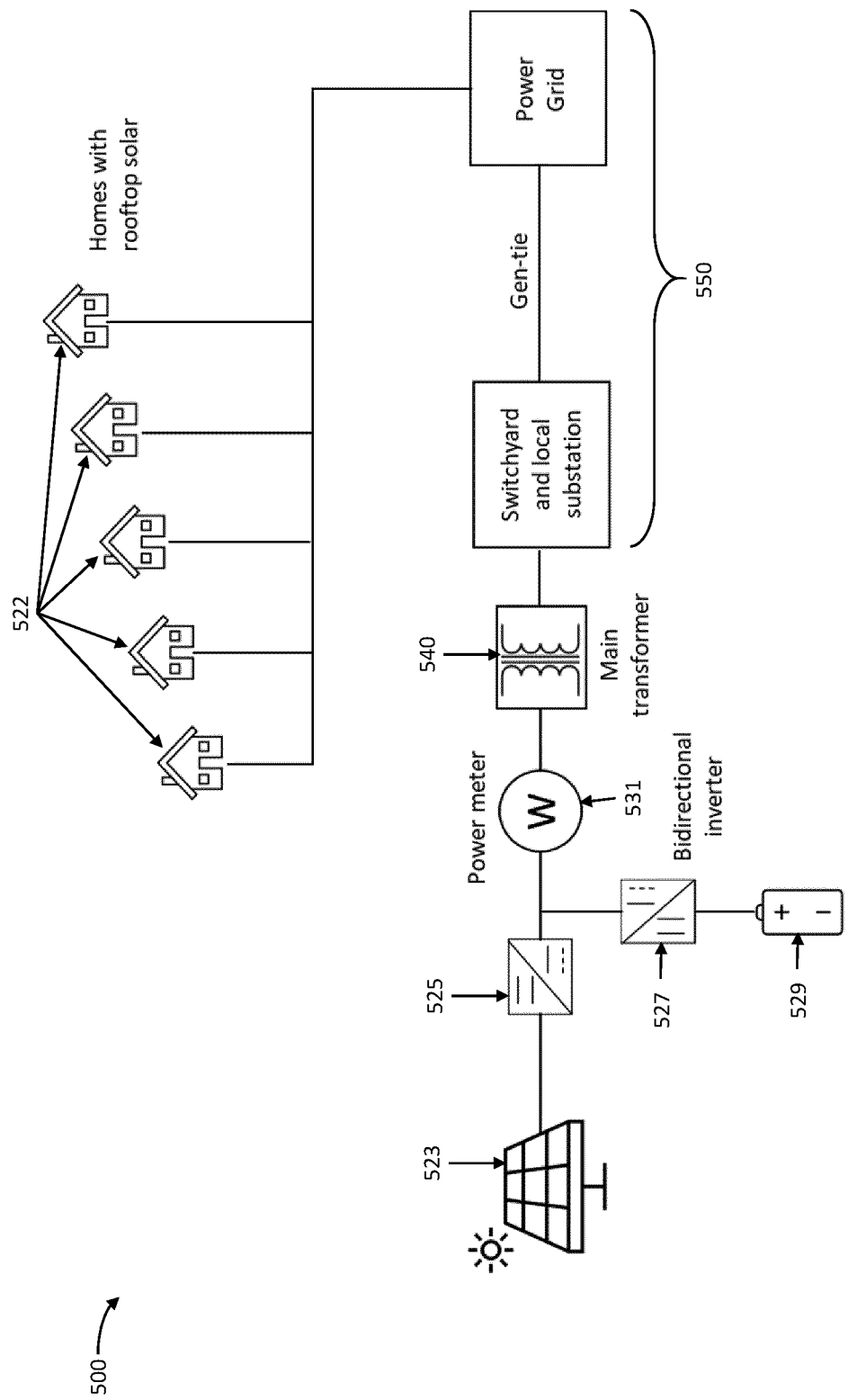
FIG. 5 is an example counter-solar power plant (CSPP) connected to a power grid to which are connected a plurality of LSORs.

FIG. 5 is an example counter-solar power plant (CSPP) connected to a power grid to which are connected a plurality of LSORs 522. The CSPP may include a counter-solar energy management system CEMS 511, a CSPP RES 523, a CSPP RES inverter 525, an ESS 529, and an ESS inverter 527. The ESS inverter 527 may be a bidirectional inverter. The CSPP RES inverter 525 may regulate a CSPP RES output. The ESS inverter 527 may regulate an ESS charge/discharge. The ESS inverter 527 may selectively charge the ESS 529 using the RES output and discharge the ESS 529 to provide power. The CEMS 511 may adjust setpoints of the CSPP RES inverter 525 and the ESS 527 to regulate the CSPP RES output and the ESS charge/discharge. The CSPP may include a power meter 531 which measures a CSPP output. The CSPP output is a combination of the CSPP RES output and the ESS charge/discharge. For example, if the CSPP RES 523 outputs 10,000 MW and 5,000 MW are used to charge the ESS 529, the CSPP output is 5,000 MW. In another example, if the CSPP RES 523 outputs 10,000 MW the ESS 529 discharges to output 5,000 MW, the CSPP output is 15,000 MW.

The CSPP may include a transformer 540. The transformer 540 may step up the CSPP output to a higher voltage for use on a grid 555. The CSPP may include an interconnection infrastructure 550. The interconnection infrastructure may include a switchyard and local substation, a gen-tie, and a point-of-of interconnect substation. The interconnection infrastructure 550 may connect to the grid 555. The grid 555 may be a utility grid.

The grid may be connected to the plurality of LSORs 522. In some embodiments, the plurality of LSORs 522 may be rooftop solar arrays on residential homes or businesses. In other embodiments, the plurality of LSORs 522 may be dedicated solar power plants. The plurality of LSORs 522 may not be connected directly to the CSPP. The plurality of LSORs 522 may be connected to the grid 555. The plurality of LSORs 522 may each have an output. A power output of the plurality of LSORs 522 may be an aggregation of the outputs of each LSOR of the plurality of LSORs 522.

The CSPP output may complement the output of the plurality of LSORs 522. The CSPP may serve as a firming plant to the plurality of LSORs 522. The CEMS 511 may receive data associated with the power outputs of the plurality of LSORs 522. The CEMS 511 may determine an estimated power output of the plurality of LSORs 522. The CEMS 511 may obtain a target power delivery profile including a plurality of target power outputs. The CEMS 511 may determine a CSPP RES output and an ESS charge/discharge (e.g., a ESS charge/discharge amount and/or schedule) such that a combined output of the CSPP and the plurality of LSORs 522 satisfies at least one of the plurality of target power outputs of the target power delivery profile.

In an example, the grid 555 may transmit a target power delivery profile to the CEMS 511. The target power delivery profile may include a plurality of target power outputs, requiring amounts of power at various times (e.g., various times during a defined time period). The CEMS 511 may obtain a power delivery profile of the plurality of LSORs 522 representing a typical output of the plurality of LSORs as determined based on historic outputs. The CEMS 511 may determine amounts of power required at different times to make up the difference between the power delivery profile of the plurality of LSORs 522 and the target power delivery profile. The CEMS 511 may determine CSPP RES inverter setpoints and ESS inverter setpoints to generate a CSPP output to provide the amounts of power required at different times. The CEMS 511 may transmit the CSPP RES inverter setpoints to the CSPP RES inverter 525 and the ESS inverter setpoints to the ESS inverter 527 to provide the CSPP output sufficient to make up the difference between the power delivery profile of the plurality of LSORs 522 and the target power delivery profile. The CSPP RES inverter setpoints and the ESS inverter setpoints may be adjusted based on an actual output of the plurality of LSORs.

In another example, the grid 555 may transmit a target power delivery profile to the CEMS 511, where the CEMS 511 uses real-time data to determine a CSPP output. The target power delivery profile may include a plurality of target power outputs, requiring amounts of power at various times. The CEMS 511 may obtain real-time data associated with the output of the plurality of LSORs 522. Real-time data is data that is used as it is acquired. For example, real-time data may include metering data from the plurality of LSORs 522. Such real-time data may be compared against the target power delivery profile by the CEMS 511 as the real-time data is acquired. The CEMS 511 may calculate a current output of the plurality of LSORs 522, a difference between the current output of the plurality of LSORs 522, and a CSPP output equal to the difference. The CEMS 511 may determine CSPP RES inverter setpoints and ESS inverter setpoints to generate the CSPP output. The CEMS 511 may transmit the CSPP RES inverter setpoints to the CSPP RES inverter 525 and the ESS inverter setpoints to the ESS inverter 527 to provide the CSPP output.

In some embodiments, the CEMS 511 may determine the CSPP output based on historic output data of the plurality of LSORs. The CEMS 511 may determine the estimated power output of the plurality of LSORs by calculating an expected power output for each LSOR of the plurality of LSORs based on the historic output data and aggregating the expected power output for each LSOR to determine the estimated power output of the plurality of LSORs. For example, a first LSOR has historic output data showing an output on a calendar day across multiple years. The expected output of the first LSOR for the calendar day may be an average of the historic outputs for the calendar day. Calculating the expected power output for each LSOR of the plurality of LSORs may include determining a formula describing a relationship between past parameters of each of the LSORs and historic outputs of each of the LSORs and executing the formula using current characteristics of each of the LSORs as input. For example, parameters of the LSORs may include conversion factor, local weather, cloud patterns, maintenance status, and other parameters. Current parameters may be compared to past parameters to select a day when the past parameters were most similar to the current parameters. The expected power output can be estimated to be equal to the historic output of the day when the past parameters were most similar to the current parameters. In another example, weights are assigned to past parameters based on their effect on the output. The weights are applied to the current parameters to calculate the expected power output. In yet another example, the current parameters of each LSOR of the plurality of LSORs are compared to past parameters associated with the historic output data and a similarity score is generated for each set of past parameters based on similarity to the current parameters of each LSOR. The current parameters of each LSOR are matched with a set of past parameters satisfying a similarity threshold and the expected power output for each LSOR is set equal to a past power output associated with the matching set of past parameters. The estimated power output of the plurality of LSORs may be an aggregation of the expected power output for each LSOR.

The CEMS 511 may use the estimated power output of the plurality of LSORs to determine a charge/discharge schedule for the ESS 527. The CEMS 511 may use the target power delivery profile and the estimated power output of the plurality of LSORs to determine a future CSPP output. The CEMS 511 may subtract the estimated power output of the plurality of LSORs from the target power output at each time specified in the target power delivery profile to determine the future CSPP output at each time. The CEMS 511 may use a forecast of CSPP RES output to determine a charge/discharge schedule for the CSPP ESS to achieve the future CSPP output at each time.

Figure 6:
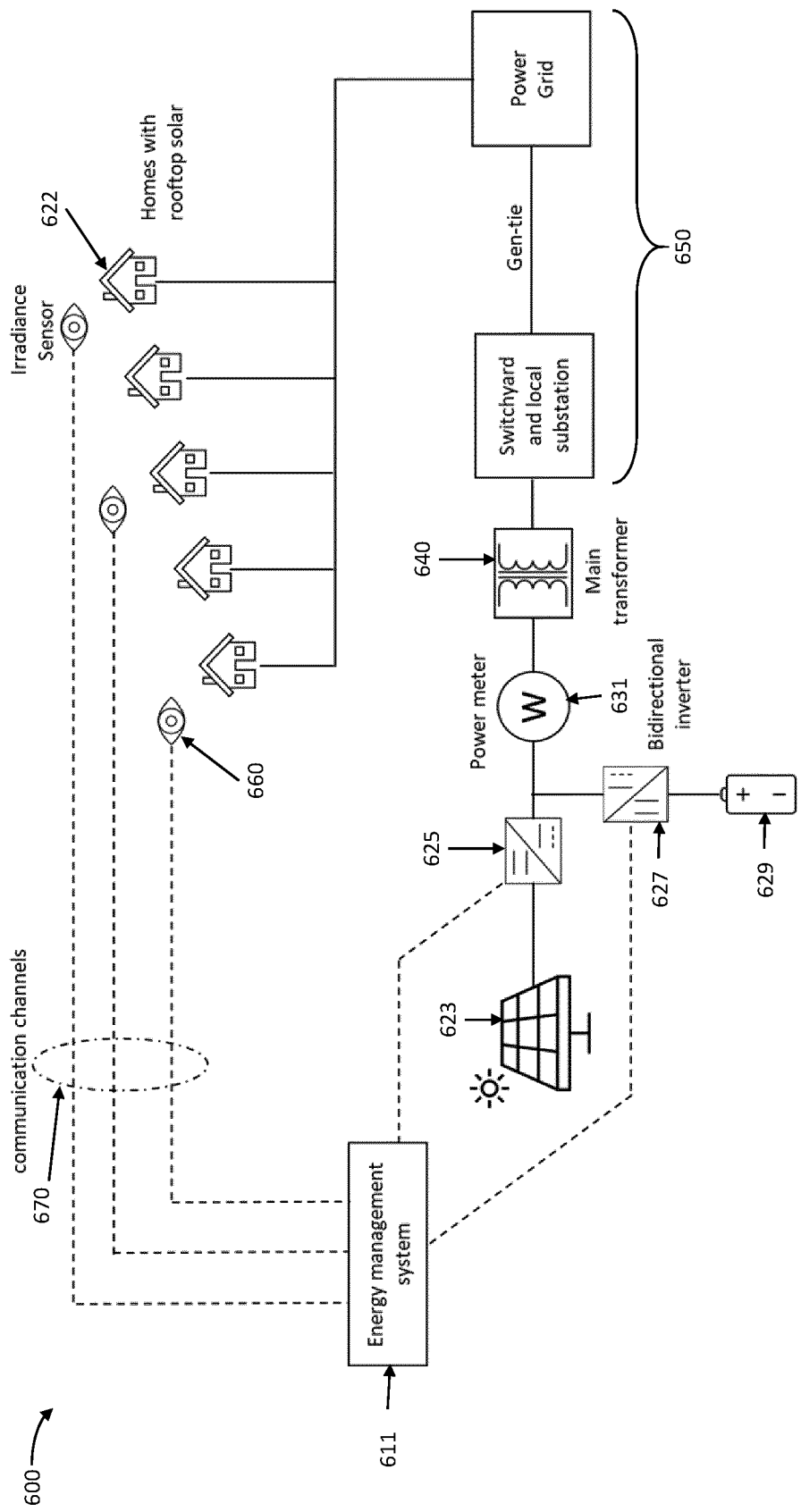
FIG. 6 is an example counter-solar power plant (CSPP) connected to a power grid to which are connected a plurality of LSORs, where a counter-solar energy management system receives irradiance data from sensors associated with the plurality of LSORs.

FIG. 6 is an example counter-solar power plant (CSPP) connected to a power grid to which are connected a plurality of LSORs 622, where a counter-solar energy management system 611 receives irradiance data from sensors 660 associated with the plurality of LSORs 622. The CSPP may be the CSPP of FIG. 5. The interconnection infrastructure 650 may be the interconnection infrastructure 550 of FIG. 5. The grid 655 may be the same or similar to the grid 555 of FIG. 5. The plurality of LSORs 622 may be the same or similar to the plurality of LSORs 522 of FIG. 5.

The sensors 660 may be irradiance sensors. The sensors 660 may measure irradiance in real time (e.g., irradiance measurements may be collected and immediately transmitted for use by the CEMS 611). In some embodiments, the sensors 660 may be located near or associated with the plurality of LSORs 622. In other embodiments, the sensors 660 may be located near or associated with the CSPP, if the CSPP is located near enough (e.g., a distance within a defined threshold) the plurality of LSORs 622 that the CSPP receives similar irradiance to the plurality of LSORs 622. For example, if the CSPP and the plurality of LSORs 622 are close enough to experience the same weather patterns, the CSPP may use irradiance measurements collected at the CSPP as an approximation of irradiance at the plurality of LSORs 622. Using sensors 660 at the CSPP in this way may eliminate the need for multiple sensors 660 to be distributed among the plurality of LSORs 622. The sensors 660 may transmit irradiance data to the CEMS 611. The CEMS 611 may calculate an irradiance for each LSOR of the plurality of LSORs 622 based on the irradiance data. For example, the CEMS 611 may calculate an irradiance for an LSOR of the plurality of LSORs 622 based on a measured irradiance of a sensor of the sensors 660 located near the LSOR. In another example, the CEMS 611 may calculate an irradiance for an LSOR of the plurality of LSORs 622 by taking a weighted average of irradiance data, where weights are assigned to irradiance data based on distance (e.g., the higher the distance, the higher or lower the respective weight) from the LSOR. In another example, the CEMS 611 may determine the amount of power a set of LSORs may generate by identify one or more sensors 660 that are within a threshold distance of each of the set of LSORs, collecting and/or identifying data that the identified one or more sensors 660 generated, and calculating the amount of energy the set of LSORs may generate based on the identified data. Accordingly, less sensors may be used to calculate the output of LSORs, which may be beneficial when calculating the amount of LSORs may generate in a crowded city with limited space to place sensors.

In an example, the plurality of LSORs 622 are rooftop solar modules distributed throughout a city. Irradiance sensors 660 are distributed throughout the city, enabling modeling of an estimated output for the plurality of LSORs 622 due to time of day, atmospheric haze, and cloud passage. Even if each LSOR of the plurality of LSORs 622 is not near an irradiance sensor of the sensors 660, the sensors 660 distributed throughout the city give a general picture of irradiance for the city such that the output of the plurality of LSORs 622 can be estimated.

The CEMS 611 may, in real time, calculate an expected power output for each LSOR of the plurality of LSORs 622 based on the irradiance data and/or the calculated irradiance for each LSOR of the plurality of LSORs 622. In some embodiments, the CEMS 611 may calculate the expected power output for each respective LSOR based on the calculated irradiance for each respective LSOR and a conversion efficiency of each respective LSOR. For example, the CEMS 611 may multiply the calculated irradiance by the conversion efficiency to calculate the expected power output. The CEMS 611 may aggregate the expected power output for each LSOR of the plurality of LSORs 622 to determine an estimated power output of the plurality of LSORs 622.

The CEMS 611 may, in real time, determine a CSPP output such that a combined CSPP output and output of the plurality of LSORs 622 satisfies a plurality of target power outputs of a target power delivery profile over a time period. The CEMS 611 may receive the target power delivery profile from the grid 655. The target power delivery profile may be based on grid requirements. The target power delivery profile may be based on a power delivery capacity of the CSPP. The target power delivery profile may be based on a power purchase agreement (PPA). The plurality of target power outputs may be amounts of power required at different times. The time period may be a day and the different times of the time period may be hours in the day. In an example, the CEMS 611 may determine the CSPP output such that the CSPP output is equal to a difference between the output of the plurality of LSORs 622 and the target power delivery profile. The CEMS 611 may determine the CSPP output for each different time of the time period. For example, the CEMS 611 may determine the CSPP output for each hour of a day as the CEMS 611 collects data such as real-time data such as irradiance data for the respective hours.

The CEMS 611 may determine a CSPP RES output and an ESS charge/discharge required to achieve the required CSPP output at the different times of the time period. The CEMS 611 may, in real time, adjust an RES setpoint of the CSPP RES inverter 625 and an ESS setpoint of the ESS inverter 627 to achieve the determined CSPP RES output and CSPP ESS charge/discharge. At each different time of the time period, the CEMS 611 may adjust the RES setpoint of the CSPP RES inverter 625 and the ESS setpoint of the ESS inverter 627 to achieve the determined CSPP RES output and CSPP ESS charge/discharge. The CEMS 611 may, each time the CSPP output is determined for each different time of the time period, determine the CSPP RES output and the ESS charge/discharge and adjust the RES setpoint and the ESS setpoint to achieve the determined CSPP RES output and the ESS charge/discharge to achieve the determined CSPP output. In an example, the CEMS 611 may determine the CSPP each hour of a day and determine the CSPP RES out and the ESS charge/discharge and adjust the RES setpoint and the ESS setpoint accordingly each hour.

The CSPP may smooth out fluctuations in the combined power output of the plurality of LSORs 622 and the CSPP over the time period. Fluctuations may arise due to the passage of clouds between solar arrays of the plurality of LSORs 622. Movement of clouds over large solar installations, such as utility-scale installations, and/or rooftop solar units of the plurality of LSORs 622 may substantially affect the output of the plurality of LSORs. The CEMS 611 may model the effects of cloud movement and control the CSPP to offset these power fluctuations.

Figure 7:
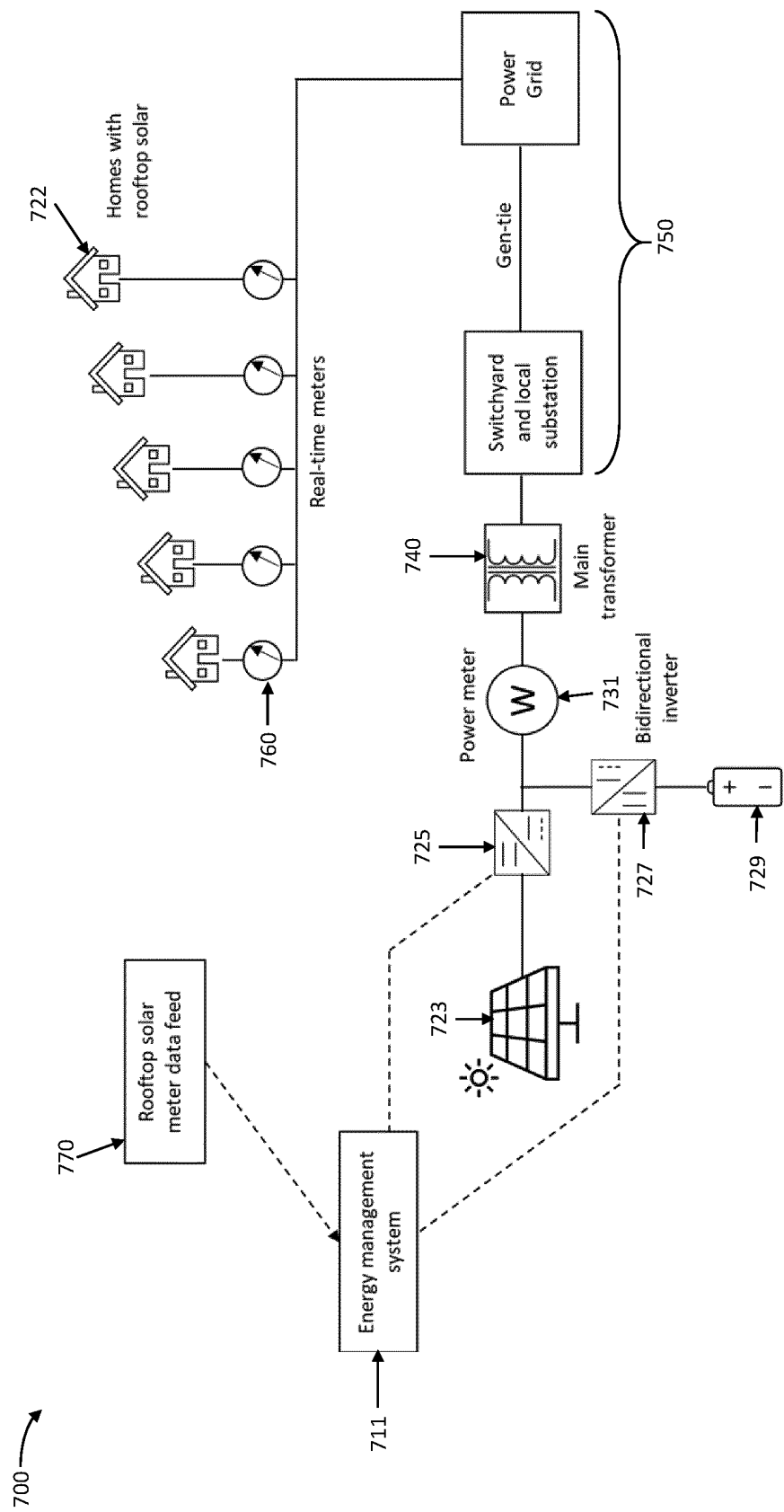
FIG. 7 is an example counter-solar power plant (CSPP connected to a power grid to which are connected a plurality of LSORs, where a counter-solar energy management system receives meter data from meters associated with the plurality of LSORs.

FIG. 7 is an example counter-solar power plant (CSPP) connected to a power grid to which are connected a plurality of LSORs 722, where a counter-solar energy management system receives meter data from meters 760 associated with the plurality of LSORs. The meters 760 may be real-time meters that measure power output and transmit measurements of power output as they are collected. The CSPP may be the CSPP of FIG. 5. The interconnection infrastructure 750 may be the interconnection infrastructure 550 of FIG. 5. The grid 755 may be the grid 555 of FIG. 5. The plurality of LSORs 722 may be the plurality of LSORs 522 of FIG. 5.

The meters 760 may be associated with the plurality of LSORs 722. In some embodiments, the meters 760 may transmit meter data to the CEMS 711. In other embodiments, the CEMS 711 may receive the meter data from a meter data feed 770. The meter data feed 770 may be associated with an entity to which the meters 760 transmit the meter data. The entity may be the grid 755, a dedicated metering system, or another entity. The meters 760 may transmit the meter data in real time, or as it is collected.

In some embodiments, the CEMS 711 may aggregate the output of each LSOR of the plurality of LSORs 760 using the meter data to determine an output of the plurality of LSORs 760. For example, each respective LSOR of the plurality of LSORs 760 may be associated with a smart meter which measures the output of the respective LSOR. Aggregating the output of each LSOR may include adding the measured output of each LSOR to determine the output of the plurality of LSORs 760. In other embodiments, the CEMS 711 may determine the output of the plurality of LSORs 722 using meter data from a subset of LSORs of the plurality of LSORs associated with the meters 760. The CEMS 711 may compare characteristics of the subset of the plurality of LSORs 722 to each of the plurality of LSORs not of the subset that do not include a real-time metering system and calculate outputs for each of the plurality of LSORs not of the subset that do not include a real-time metering system. A real-time metering system is or may include a meter that collects power output data and transmits that data as it is collected. The compared characteristics may include output capacity, conversion factor, location, and other characteristics. For example, a first LSOR includes a real-time metering system and is part of the subset and a second LSOR does not include a real-time metering system and is not part of the subset. The first LSOR and the second LSOR may have the same size, output capacity, conversion factor, orientation, and be located on adjacent rooftops. Due to the similarity of the first LSOR and the second LSOR, the output of the second LSOR can be estimated as being equal to the output of the first LSOR. In this example, the first LSOR and the second LSOR may be matched based on characteristics of the first LSOR and the second LSOR. In some embodiments, the CEMS 711 matches the first LSOR and the second LSOR based on stored characteristics of the first LSOR and the second LSOR. In other embodiments, the first LSOR and the second LSOR are pre-matched, and the CEMS 711 retrieves the match data to determine the estimated output of the second LSOR based on the output of the first LSOR. In another example, characteristics of the subset of the plurality of LSORs may be compared to outputs of the subset to determine what effect each characteristic has on output. Weights are assigned to characteristics based on their effect on output. The weights are applied to characteristics of the LSORs not of the subset to estimate their output.

In an example, the plurality of LSORs 722 are rooftop solar modules distributed throughout a city. A subset of the plurality of LSORs 722 are associated with meters 760 which track the outputs of each LSOR of the subset. Due to the plurality of LSORs 722 being in the same city, each LSOR of the plurality of LSORs 722 experiences similar atmospheric haze, irradiance, and weather patterns. Thus, the outputs of the subset of the plurality of LSORs associated with meters enable modeling of an estimated output of the plurality of LSORs.

The CEMS 711 may, in real time, determine a CSPP output such that a combined CSPP output and the output of the plurality of LSORs 722 satisfies a plurality of target power outputs of a target power delivery profile. The CEMS 611 may receive the target power delivery profile from the grid 755. The target power delivery profile may be based on grid requirements. The target power delivery profile may be based on a power delivery capacity of the CSPP. The target power delivery profile may be based on a power purchase agreement (PPA). The plurality of target power outputs may be amounts of power required at different times. In an example, the CEMS 611 may determine the CSPP output such that the CSPP output is equal to a difference between the output of the plurality of LSORs 722 and the target power delivery profile.

The CEMS 711 may determine a CSPP RES output and an ESS charge/discharge required to achieve the required CSPP output. The CEMS 711 may, in real time, adjust an RES setpoint of the CSPP RES inverter 725 and an ESS setpoint of the ESS inverter 727 to achieve the determined CSPP RES output and CSPP ESS charge/discharge.

The CSPP may smooth out fluctuations in the combined power output of the plurality of LSORs 722 and the CSPP over the time period. Fluctuations may arise due to the passage of clouds between solar arrays of the plurality of LSORs 722. Movement of clouds over large solar installations, such as utility-scale installations, and/or rooftop solar units of the plurality of LSORs 722 may substantially affect the output of the plurality of LSORs. The CEMS 711 may model the effects of cloud movement and control the CSPP to offset these power fluctuations.

Figure 8:
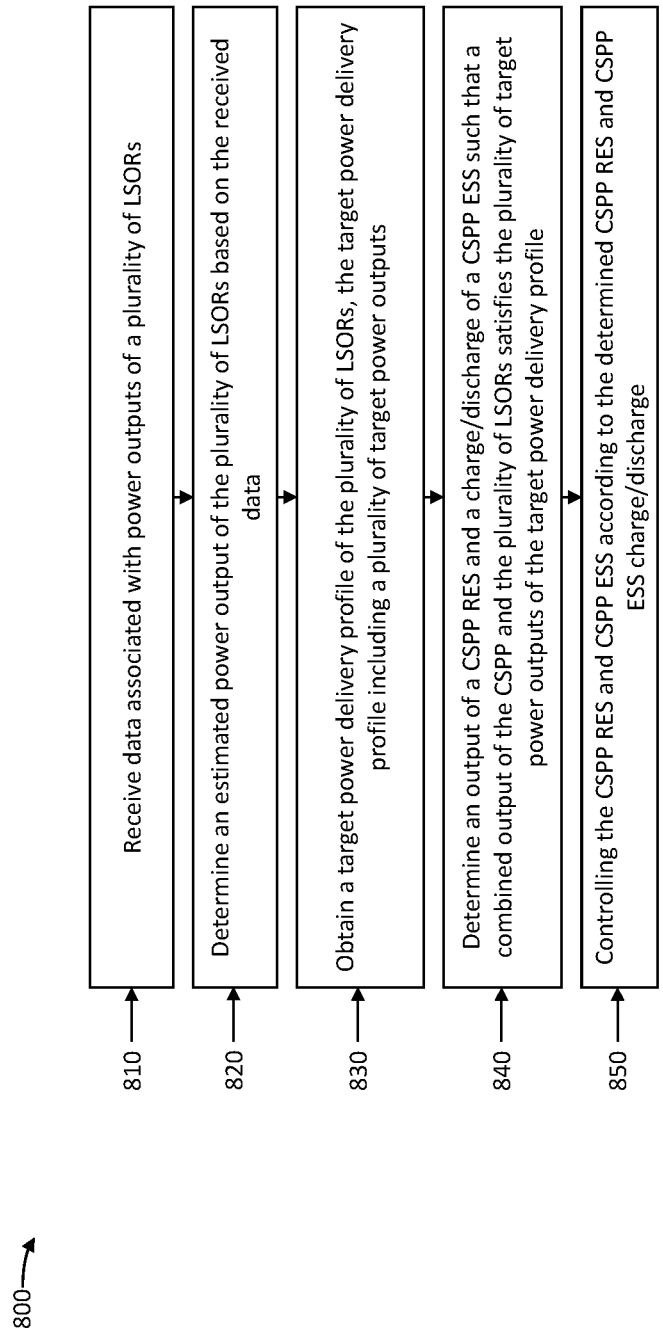
FIG. 8 is an example flowchart illustrating operations for controlling a CSPP, in accordance with one or more embodiments.

FIG. 8 is an example flowchart 800 illustrating operations for controlling a CSPP, in accordance with one or more embodiments. Additional, fewer, or different operations may be performed in the method, depending on the embodiment. Further, the operations may be performed in the order shown, concurrently, or in a different order.

At 810, a CSPP controller receives data associated with power outputs of a plurality of LSORs. In some embodiments, the data may include irradiance data collected near the plurality of LSORs. The irradiance data may be collected by irradiance sensors located near the plurality of LSORs. The irradiance sensors may be located near first LSORs and not near second LSORs of the plurality of LSORs. The irradiance sensors may be incorporated into the plurality of LSORs or separate from the plurality of LSORs. The irradiance data may be collected in real-time. In other embodiments, the data may include metering data of a subset of the plurality of LSORs that each include a real-time metering system. In yet other embodiments, the data may include historic output data of the plurality of LSORs. The historic output data may include parameters of the historic output data such as date, season, weather, LSOR status, and irradiance.

At 820, the CSPP controller determines an estimated power output of the plurality of LSORs based on the received data. In some embodiments, the data may include irradiance data collected near the plurality of LSORs and determining the estimated power output of the plurality of LSORs includes calculating an expected output for each LSOR of the plurality of LSORs based on the irradiance data and aggregating the expected power output for each LSOR to determine the estimated power output of the plurality of LSORs. Calculating the expected output for each LSOR of the plurality of LSORs may include calculating an irradiance for each respective LSOR of the plurality of LSORs using the irradiance data and calculating the expected power for each respective LSOR based on a conversion efficiency of the respective LSOR.

In other embodiments, the data may include outputs measured at a subset of the plurality of LSORs that each include a real-time metering system and determining the estimated power output of the plurality of LSORs includes comparing characteristics of the subset of the plurality of LSORs to each of the plurality of LSORs not of the subset that do not include a real-time metering system, and calculating outputs for each of the plurality of LSORs that do not include a real-time metering system. The compared characteristics may include output capacity, conversion factor, location, and other characteristics. For example, a first LSOR includes a real-time metering system and is part of the subset and a second LSOR does not include a real-time metering system and is not part of the subset. The first LSOR and the second LSOR may have the same size, output capacity, conversion factor, orientation, and be located on adjacent rooftops. Due to the similarity of the first LSOR and the second LSOR, the output of the second LSOR can be estimated as being equal to the output of the first LSOR. In another example, characteristics of the subset of the plurality of LSORs may be compared to outputs of the subset to determine what effect each characteristic has on output. Weights are assigned to characteristics based on their effect on output. The weights are applied to characteristics of the LSORs not of the subset to estimate their output.

In yet other embodiments, the data may include historic output data of the plurality of LSORs and the determining the estimated power output of the plurality of LSORs includes calculating an expected power output for each LSOR of the plurality of LSORs based on the historic output data and aggregating the expected power output for each LSOR to determine the estimated power output of the plurality of LSORs. For example, a first LSOR has historic output data showing an output on a calendar day across multiple years. The expected output of the first LSOR for the calendar day may be an average of the historic outputs for the calendar day. Calculating the expected power output for each LSOR of the plurality of LSORs may include determining a formula describing a relationship between past parameters of each of the LSORs and historic outputs of each of the LSORs and executing the formula using current characteristics of each of the LSORs as input. For example, parameters of the LSORs may include conversion factor, local weather, cloud patterns, maintenance status, and other parameters. Current parameters may be compared to past parameters to select a day when the past parameters were most similar to the current parameters. The expected power output can be estimated to be equal to the historic output of the day when the past parameters were most similar to the current parameters. In another example, weights are assigned to past parameters based on their effect on the output. The weights are applied to the current parameters to calculate the expected power output. In yet another example, the current parameters of each LSOR of the plurality of LSORs are compared to past parameters associated with the historic output data and a similarity score is generated for each set of past parameters based on similarity to the current parameters of each LSOR. The current parameters of each LSOR are matched with a set of past parameters satisfying (e.g., exceeding and/or reaching) a similarity threshold and the expected power output for each LSOR is set equal to a past power output associated with the matching set of past parameters.

At 830, the CSPP controller obtains a target power delivery profile of the plurality of LSORs, the target power delivery profile including a plurality of target power outputs. The target power delivery profile of the plurality of LSORs may be a target power delivery profile for the plurality of LSORs when supplemented by the CSPP. The target power delivery profile may be based on grid requirements. The target power delivery profile may be based on a power delivery capacity of the CSPP. The target power delivery profile may be based on a power purchase agreement (PPA). The plurality of target power outputs may be amounts of power required at different times.

At 840, the CSPP controller determines an output of a CSPP RES and a charge/discharge of a CSPP ESS such that a combined output of the CSPP and the plurality of LSORs satisfies at least one of the plurality of target power outputs of the target power delivery profile. In an example, the CSPP controller subtracts the estimated power output of the plurality of LSORs from the target power delivery profile to determine a CSPP output. The CSPP output is the sum of the CSPP RES output and the CSPP ESS charge/discharge. The CSPP RES output and the CSPP ESS charge/discharge are determined to achieve the CSPP output. In some embodiments, the CSPP ESS has a power capacity equal to or greater than the plurality of target power output of the target power delivery profile. The CSPP ESS may have a storage capacity equal to an amount of energy necessary to meet the plurality of target power outputs. In some embodiments, the CSPP RES includes a plurality of RESs and the CSPP ESS includes a plurality of ESSs and the controller is configured to adjust RES setpoints of the plurality of RESs and ESSs setpoints of the plurality of ESSs to achieve an aggregate CSPP RES output equal to the determined CSPP RES output and an aggregate CSPP ESS output equal to the determined CSPP ESS charge/discharge. The RES setpoints may be setpoints for RES inverters. The ESS setpoints may be setpoints for ESS inverters. In some embodiments, each RES is coupled to an RES inverter and each ESS is coupled to an ESS inverter. In other embodiments, each RES inverter is coupled to two or more RESs and each ESS inverter is coupled to two or more ESSs.

AT 850, the CSPP controller controls the CSPP RES output and the CSPP ESS according to the determined CSPP RES and CSPP ESS charge/discharge. Controlling the CSPP RES and the CSPP ESS includes adjusting an RES setpoint of an RES inverter coupled to the CSPP RES and an ESS setpoint of an ESS inverter coupled to the CSPP ESS to achieve the determined CSPP RES output and CSPP ESS charge/discharge. The ESS inverter may be bidirectional, allowing for the ESS to be charged by the RES and for the ESS to discharge power to the grid. In some embodiments, determining the charge/discharge of the CSPP ESS includes determining a charge/discharge schedule for the CSPP ESS. The charge/discharge schedule may be updated based on an updated estimated power output of the plurality of LSORs. In other embodiments, determining the CSPP RES output and CSPP ESS charge/discharge is done in real-time.

Figure 9:
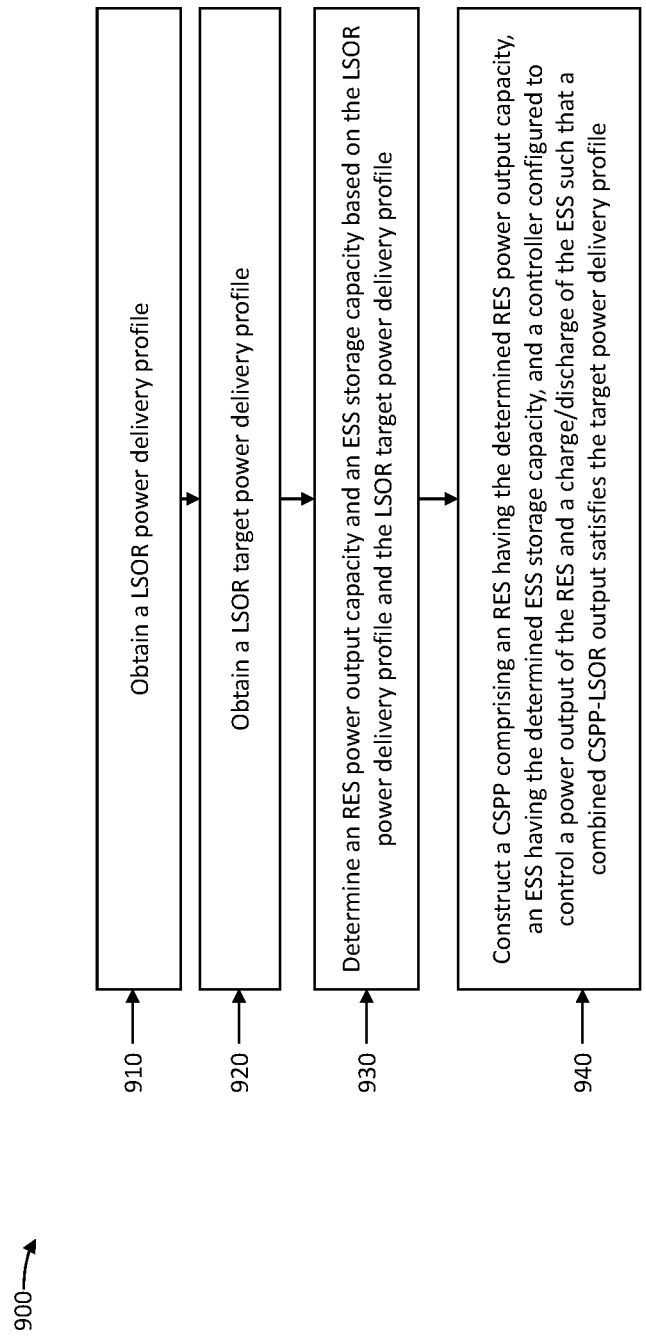
FIG. 9 is an example flowchart illustrating operations for constructing and controlling a CSPP, in accordance with one or more embodiments.

FIG. 9 is an example flowchart illustrating operations for constructing and controlling a CSPP, in accordance with one or more embodiments. Additional, fewer, or different operations may be performed in the method, depending on the embodiment. Further, the operations may be performed in the order shown, concurrently, or in a different order.

At 910, an LSOR power delivery profile is obtained. The LSOR power delivery profile may be based on historic LSOR output data. For example, an LSOR has historic output data showing output on a calendar day. The power delivery profile of the LSOR for the calendar day may be an average of the historic outputs for the calendar day. The LSOR power delivery profile may change day by day. For example, the LSOR power delivery profile may be different for each calendar day, based on historic outputs associated with each respective calendar day. The LSOR power delivery profile may be an average or an aggregation of a plurality of LSOR power delivery profiles for different days. For example, the LSOR power delivery may be an average of all LSOR power delivery profiles for a calendar week, a calendar month, a season, a year, or any period of time.

At 920, an LSOR target power delivery profile is obtained. The LSOR target power delivery profile may include a plurality of target power outputs. The LSOR target power delivery profile may be a target power delivery profile for the LSOR when supplemented by a CSPP. The LSOR target power delivery profile may be based on grid requirements. The LSOR target power delivery profile may be based on a power delivery capacity of the CSPP. The LSOR target power delivery profile may be based on a power purchase agreement (PPA). The plurality of target power outputs may be amounts of power required at different times.

At 930, an RES power output capacity and an ESS storage capacity are determined based on the LSOR power delivery profile and the LSOR target power delivery profile. In some embodiments, the RES power output capacity is determined to be equal to an amount of energy required to satisfy the LSOR target power delivery profile, minus the LSOR power delivery profile. In an example, the LSOR target power delivery profile requires 10,000 Megawatt hours over the course of a day and the LSOR power delivery profile delivers 5,000 Megawatt hours over the course of the day. The RES power output capacity may be 5,000 Megawatt hours over the course of the day. The RES power output capacity may be higher to account for transmission losses, variations in RES output, and variations in LSOR output. This RES power output capacity allows the RES to provide an amount of power required to satisfy the LSOR target power delivery profile when combined with the LSOR power delivery profile.

The ESS storage capacity is determined based on how much power must be stored in order to shift the RES output in time to satisfy the target power delivery profile. In an example, the RES is a solar array with a power output profile similar to the LSOR power delivery profile. Even if the RES power output capacity is sufficiently high to produce an amount of power required to satisfy the LSOR target power delivery profile when combined with the LSOR power delivery profile, the RES may not provide power at the correct times to satisfy the LSOR target power delivery profile. The ESS storage capacity may be determined to store RES output when it is not needed to satisfy the target power delivery profile and provide power when it is needed to satisfy the target power delivery profile. In an example, the LSOR target power delivery profile requires 10,000 Megawatt hours over the course of a day and the LSOR power delivery profile delivers 5,000 Megawatt hours over the course of the day. The RES power output capacity is 5,000 Megawatt hours over the course of the day, but due to the RES power delivery profile, 3,000 of the 5,000-Megawatt hours of the RES power output capacity are delivered at time that do not server to satisfy the LSOR target delivery profile. The ESS storage capacity may be 3,000 Megawatt hours. The ESS storage capacity may be higher to account for transmission losses, variations in RES output, and variations in LSOR output. This ESS storage capacity allows the ESS and RES to provide power to satisfy the LSOR target power delivery profile when combined by the LSOR power delivery profile.

At 940, A counter-solar power plant (CSPP) is constructed including an RES having the determined RES power output capacity, an ESS having the determined ESS storage capacity, and a controller configured to control a power output of the RES and a charge/discharge of the ESS such that a combined CSPP-LSOR output satisfies the target power delivery profile. Controlling the CSPP RES and the CSPP ESS may include adjusting an RES setpoint of an RES inverter coupled to the CSPP RES and adjusting an ESS setpoint of a bidirectional ESS inverter coupled to the CSPP ESS, as discussed herein.

Figure 10:
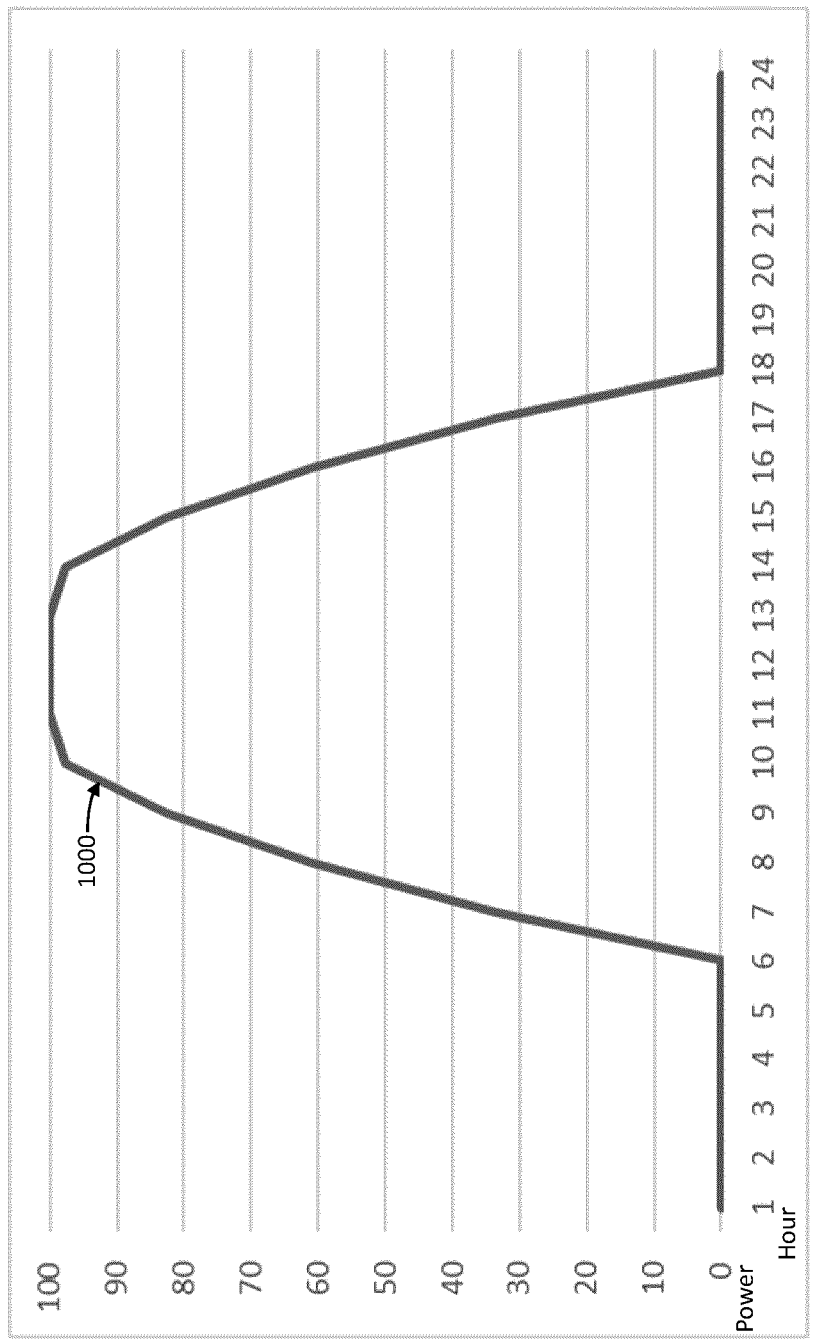
FIG. 10 is an example output of an example LSOR, in accordance with one or more embodiments.

FIG. 10 is an example output 1000 of an example LSOR, in accordance with one or more embodiments. The "hour" axis may denote hours in a day. The "power" axis may denote output as a percentage of the LSOR interconnection infrastructure transmission capacity. The output 1000 may be a power output profile 1000 of the LSOR. The output 1000 may be an LSOR power output profile showing a weighted average of multiple days of output or a representative day of output. The LSOR may be a solar array. The output 1000 may be zero until sunrise, when the solar array begins to produce power. The output 1000 may rise until it reaches the transmission capacity or an output capacity of the LSOR, at which point it flattens. The output 1000 may fall in the afternoon until it reaches zero around sunset. The output 1000 is zero at night until the following morning.

Figure 11:
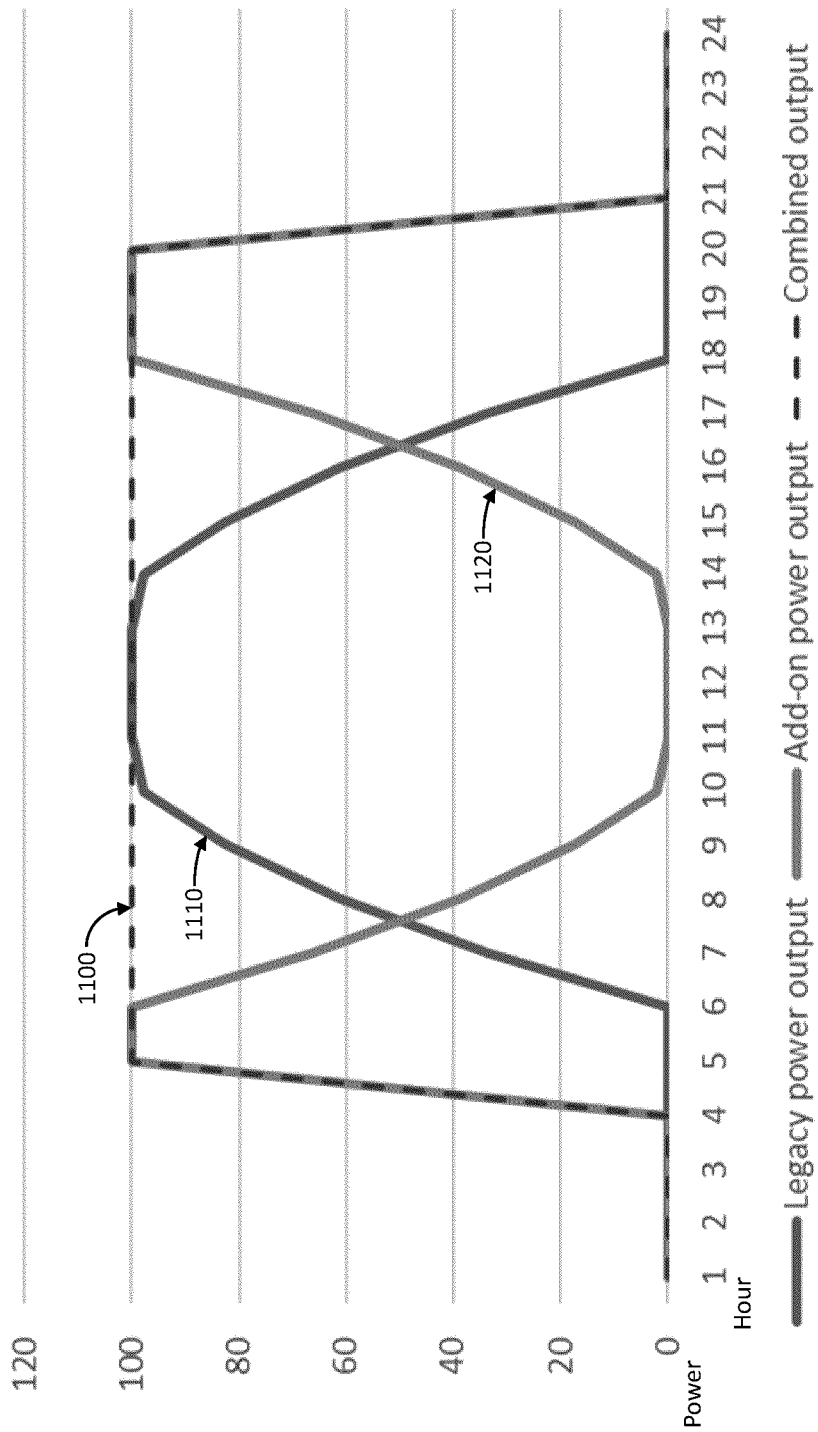
FIG. 11 is an example combined output of an example CSPP and an example LSOR, in accordance with one or more embodiments.

FIG. 11 is an example combined output 1100 of an example CSPP and an example LSOR, in accordance with one or more embodiments. The "hour" axis may denote hours in a day. The "power" axis may denote output as a percentage of the LSOR interconnection infrastructure transmission capacity. The combined output 1100 may be a combination of an LSOR output 1110 and a CSPP output 1120. The LSOR output 1110 may be the LSOR output 1000 of FIG. 10. FIG. 11 may show a combined output 900 for the CSPP and LSOR of FIGS. 2-4.

The CSPP output 1120 may complement the LSOR output 1110 such that the combined output 1100 is consistent and smooth. The CSPP output 1120 may be the output of a CSPP RES and CSPP ESS, where the CSPP ESS is configured to store power produced by the CSPP RES and output the stored power. The CSPP output is the sum of the CSPP RES output and the CSPP ESS charge/discharge. The CSPP RES may be a solar array with an output similar to the LSOR output 1110. The CSPP ESS may store the CSPP RES output for later use. Around noon, when the LSOR output 1110 is equal to the transmission capacity, the entirety of the CSPP RES output is available to charge the CSPP ESS and the CSPP output 1120 may be zero. The CSPP RES output is either being directed to the grid as CSPP output 1120, being used to charge the CSPP ESS, split between the grid and the CSPP ESS, or being curtailed. Energy stored in the CSPP ESS may be discharged to the grid as needed.

The CSPP RES and CSPP ESS may be tuned to complement the LSOR output 1110. The CSPP RES and CSPP ESS may be tuned to complement the LSOR output 1110 such that the combined output 1100 provides consistent power for a time interval such as from 4:00 to 21:00. The CSPP RES may be tuned to have an output capacity equal to the LSOR transmission capacity for the time interval minus the LSOR output 1110 for the time interval. The CSPP ESS may be tuned to store the power equal to the CSPP RES output capacity for the time interval minus the CSPP output 1120 for the time interval. The tuned CSPP RES and CSPP ESS may be able to produce and store sufficient power to provide the CSPP output 1120 for the time interval to complement the LSOR output 1110 for the time interval such that the combined output 1100 is consistent for the time interval.

Figure 12:
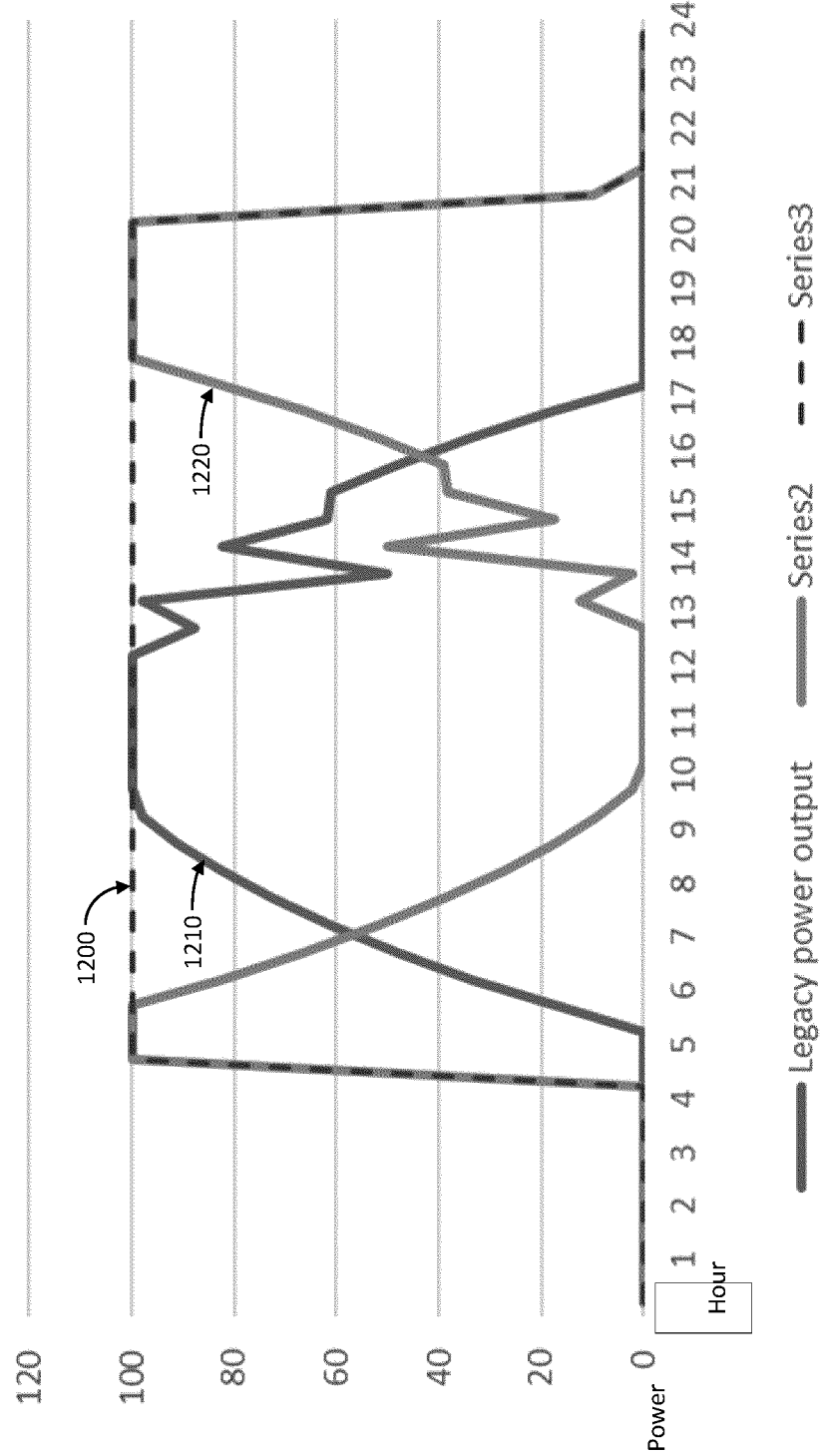
FIG. 12 is another example combined output of an example CSPP and an example LSOR, in accordance with one or more embodiments.

FIG. 12 is another example combined output 1200 of an example CSPP and an example LSOR, in accordance with one or more embodiments. FIG. 12 may show a combined output 1200 for the CSPP and LSOR of FIG. 8 for a day when the LSOR output 1210 is inconsistent. FIG. 12 may show a combined output 1200 for the CSPP and LSOR of FIGS. 2-4 for a day when the LSOR output 1210 is inconsistent. The LSOR output 1210 may be inconsistent due to clouds passing over the solar array of the LSOR, due to maintenance, or other factors. The CSPP output 1220 may be adjusted in real time to complement the LSOR output 1210, as described herein. The combined output 1200 may not be consistent for the entire time interval of 4:00 to 21:00 as it was in FIG. 8. The combined output 1200 may have a priority to maintain consistent output for as long as possible or to maintain consistent output for the time interval as consistently as possible. FIG. 12 shows the combined output 1200 having a priority to maintain consistent output for as long as possible, maintaining the combined output 1200 at peak output until shortly before 21:00.

In an example, afternoon clouds disrupt the LSOR output 1210 between noon and 2:00 pm and between 3:00 pm and 4:00 pm. The CSPP output 1220 may increase to offset the reduced output of the LSOR. The CSPP output 1220 may be able to be increase because the CSPP has greater output capacity than the LSOR and the CSPP includes an ESS having stored energy. The CSPP output 1220 may be reduced due to the clouds as well, meaning that the ESS of the CSPP is fully discharged earlier than it would be if the CSPP output 1220 were not affected by the clouds. However, total power production remains steady through the afternoon and early evening. This is advantageous because a grid operator may be alerted to the reduced CSPP output 1220 and LSOR output 1210 and may plan for additional power output from other sources to be used once the CSPP ESS is fully depleted.

Figure 13:
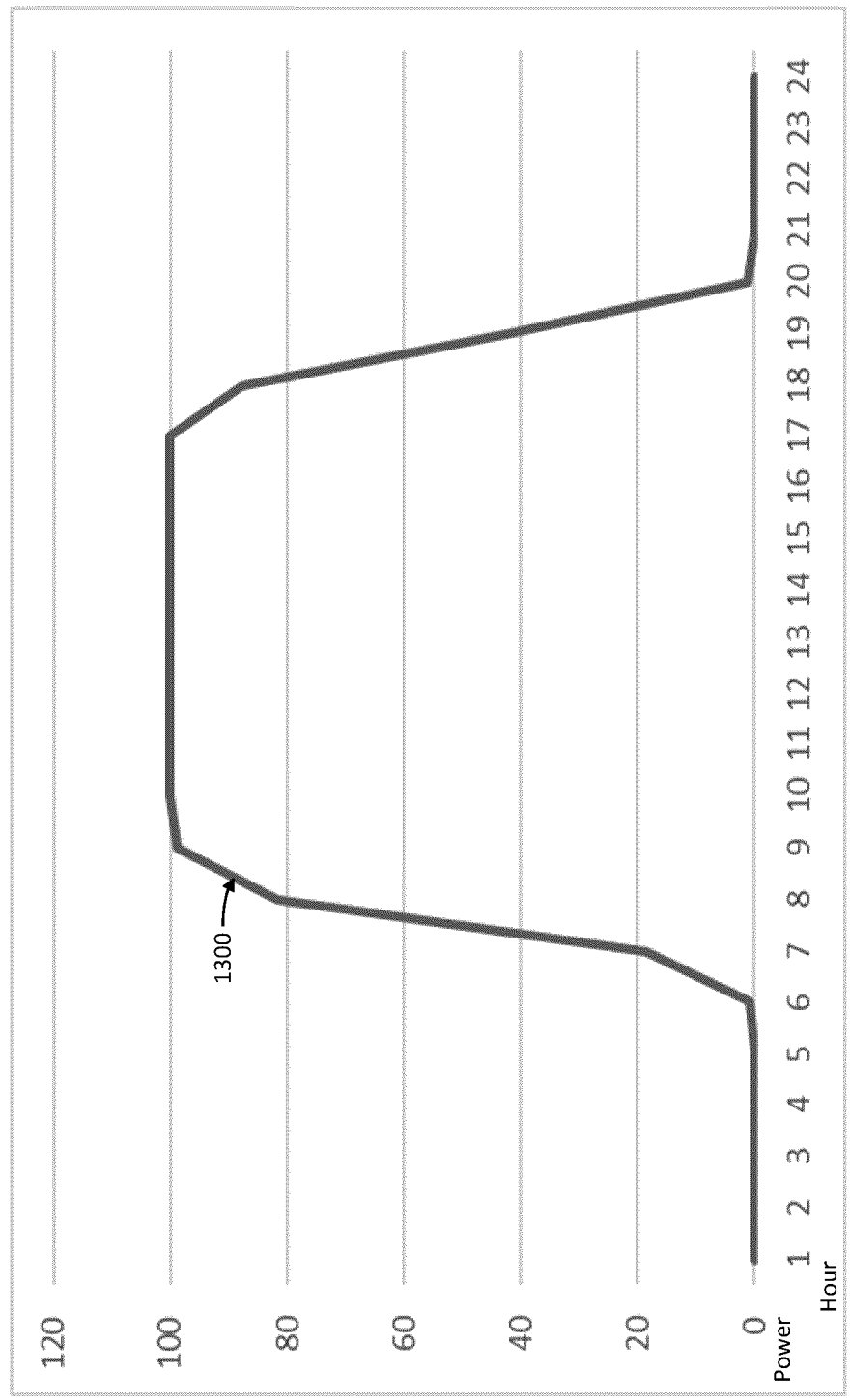
FIG. 13 is another example output of an example LSOR, in accordance with one or more embodiments.

FIG. 13 is another example output 1300 of an example LSOR, in accordance with one or more embodiments. The LSOR output 1300 is an output of an LSOR having a solar array incorporating solar trackers. The solar trackers allow the LSOR output 1300 to rise earlier and reach the peak output earlier in the day, as compared to the output 1000 of FIG. 10.

Figure 14:
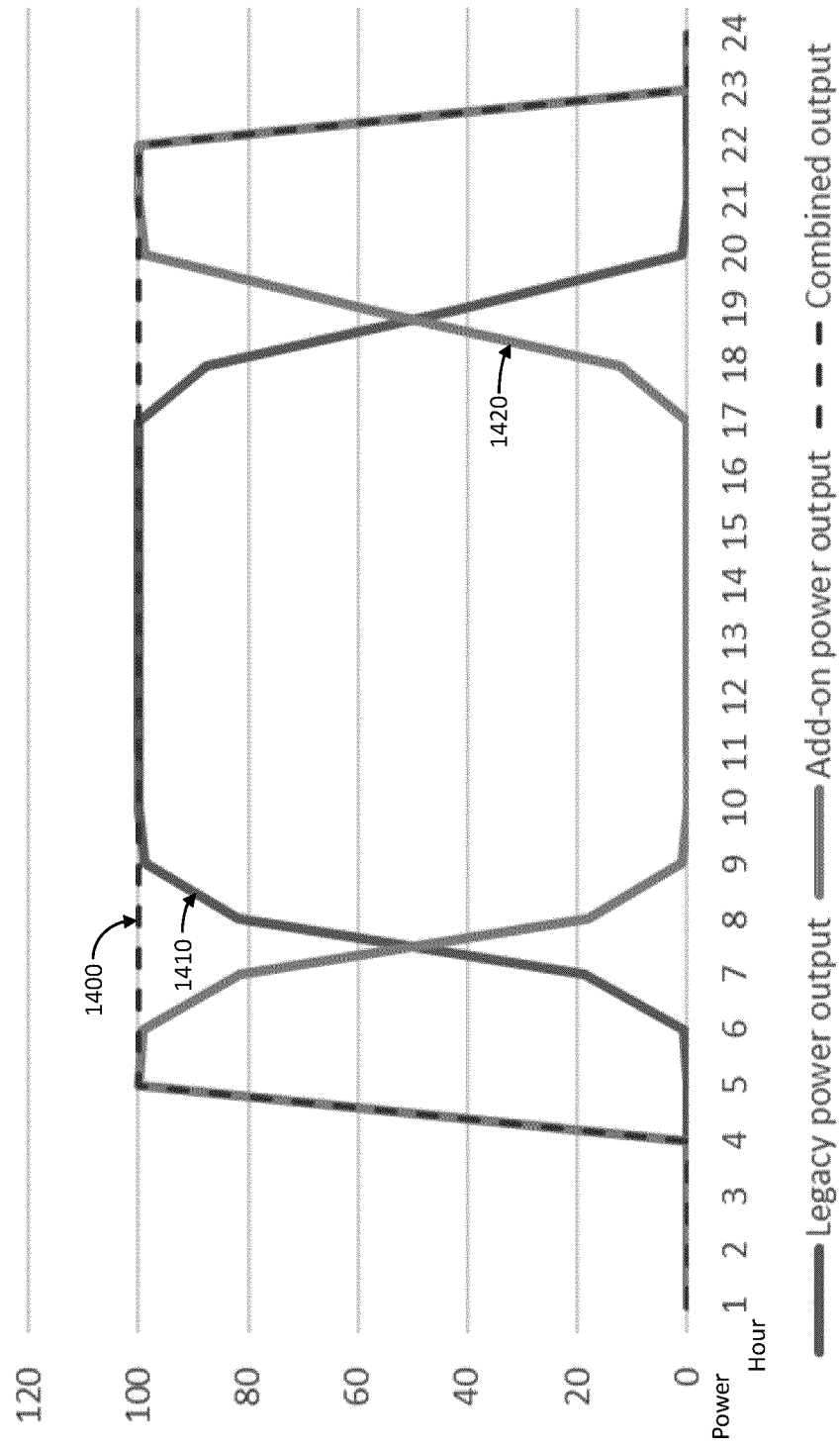
FIG. 14 is yet another example combined output of an example CSPP and an example LSOR, in accordance with one or more embodiments.

FIG. 14 is yet another example combined output 1400 of an example CSPP and an example LSOR, in accordance with one or more embodiments. The combined output 1400 is a combination of an LSOR output 1410 and a CSPP output 1420. The LSOR output 1410 may be the LSOR output 1300 of FIG. 13. The CSPP output 1420 may complement the LSOR output 1410, as described herein. Due to the increased LSOR output 1410, the combined output 1400 may be consistent for longer than the combined output 1100 of FIG. 11. The combined output 1400 may be consistent about 4:00 to 23:00.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A counter-solar power plant (CSPP) comprising:
a counter-solar power plant (CSPP) renewable energy system (RES) including a solar array, an inverter, a meter, a CSPP energy storage system (ESS), and a controller configured to execute instructions stored in a memory, the instructions including operations comprising:
receiving data associated with a power output of a legacy solar-only resource (LSOR), wherein the LSOR includes a legacy solar array, a legacy controller, a legacy inverter, a legacy meter that provides the data, and a transformer connected to an interconnection infrastructure by which power is delivered to an electric grid;
determining an estimated power output of the LSOR based on the received data;
obtaining a target power delivery profile including a plurality of target power outputs each indicating a target amount of power to be delivered at different times of a time period;
determining an output of the CSPP renewable energy system (RES) to the transformer of the LSOR and a charge/discharge of the CSPP ESS such that a combined output of the CSPP and the estimated power output of the LSOR satisfies at least one of the plurality of target power outputs of the target power delivery profile throughout the time period; and
during the time period, adjusting an ESS setpoint of an ESS inverter coupled to the CSPP ESS to achieve the determined CSPP ESS charge/discharge.

2. The CSPP of claim 1, wherein receiving the data associated with the power output of the LSOR comprises receiving the data at different times during the time period, and wherein determining the estimated power output of the LSOR comprises determining the estimated power output at each of the different times based on the received data.

3. The CSPP of claim 2, wherein receiving the data associated with the power output of the LSOR comprises receiving data associated with a plurality of LSORs, and wherein the data associated with the power outputs of the plurality of LSORs includes outputs measured by a real-time metering system at each LSOR of the plurality of LSORs, and wherein the operations comprise aggregating the measured outputs to calculate an estimated power output of the plurality of LSORs, and wherein the output of the CSPP RES and the charge/discharge of the CSPP ESS are determined using the estimated power output of the plurality of LSORs.

4. The CSPP of claim 2, wherein receiving the data associated with the power output of the LSOR comprises receiving data associated with a plurality of LSORs, and wherein the data associated with the power outputs of the plurality of LSORs includes irradiance data collected near the plurality of LSORs, and wherein the operations comprise:
calculating an expected power output for each LSOR of the plurality of LSORs based on the irradiance data, and
aggregating the expected power output for each LSOR to determine an estimated power output of the plurality of LSORs, wherein the output of the CSPP RES and the charge/discharge of the CSPP ESS are determined using the estimated power output of the plurality of LSORs.

5. The CSPP of claim 4, wherein the operations comprise calculating the expected power output for each respective LSOR of the plurality of LSORs based on the irradiance data by calculating an irradiance for each respective LSOR of the plurality of LSORs using the irradiance data and calculating the expected output for each respective LSOR based on a conversion efficiency of the respective LSOR.

6. The CSPP of claim 1, wherein receiving the data associated with the power output of the LSOR comprises receiving data associated with a plurality of LSORs, and wherein the data associated with the power outputs of the plurality of LSORs includes historic output data of the plurality of LSORs and wherein the operations comprise:

calculating an expected power output for each LSOR of the plurality of LSORs based at least in part on the historic output data; and aggregating the expected power output for each LSOR to determine the estimated power output of the plurality of LSORs, wherein the output of the CSPP RES and the charge/discharge of the CSPP ESS are determined using the estimated power output of the plurality of LSORs.

7. The CSPP of claim 6, wherein the operations comprise calculating the expected power output for each LSOR of the plurality of LSORs based on the historic output data by:

comparing current parameters of each of the LSORs to past parameters associated with the historic output data and generating a similarity score for each set of past parameters based on similarity to the current parameters of each LSOR;

matching sets of past parameters to the current parameters based on the sets of past parameters satisfying a similarity threshold; and setting the expected power output for each LSOR to a past power output associated with the matching set of past parameters.

8. The CSPP of claim 2, wherein receiving the data associated with the power output of the LSOR comprises receiving data associated with a plurality of LSORs, and wherein the data associated with the power outputs of the plurality of LSORs includes outputs measured at a subset of the plurality of LSORs that each include a real-time metering system, and wherein the operations comprise:

comparing characteristics of the subset of the plurality of LSORs to each of the plurality of LSORs not of the subset that do not include a real-time metering system; and calculating outputs for each of the plurality of LSORs not of the subset based on the compared characteristics, wherein the controller is configured to calculate the estimated power output of the plurality of LSORs using the measured outputs of the subset and the calculated outputs of the plurality of LSORs not of the subset, wherein the output of the CSPP RES and the charge/discharge of the CSPP ESS are determined using the estimated power output of the plurality of LSORs.

9. The CSPP of claim 1, wherein the CSPP is connected to an interconnection infrastructure of the LSOR.

10. The CSPP of claim 1, wherein the CSPP ESS has a power capacity equal to or greater than the plurality of target power outputs of the target power delivery profile.

11. The CSPP of claim 1, wherein the CSPP RES comprises a plurality of RESs and the CSPP ESS comprises a plurality of ESSs, and the operations comprise adjusting RES setpoints of the plurality of RESs and ESS setpoints of the plurality of ESSs to achieve an aggregate CSPP RES output equal to the determined CSPP RES output and an aggregate CSPP ESS output equal to the determined CSPP ESS charge/discharge.

12. A method comprising:

receiving, by a controller executing instructions stored in a memory, data associated with a power output of a legacy solar-only resource (LSOR), wherein the LSOR includes a legacy solar array, a legacy controller, a legacy inverter, a legacy meter that provides the data, and a transformer connected to an interconnection infrastructure by which power is delivered to an electric grid;

determining, by the controller, an estimated power output of the LSOR based on the received data obtaining, by the controller, a target power delivery profile, the target power delivery profile including a plurality of target power outputs to deliver at different times of a time period;

determining, by the controller, an output of a counter-solar power plant (CSPP) renewable energy system (RES) to the transformer of the LSOR and a charge/discharge of a CSPP energy storage system (ESS) such that a combined output of the CSPP and the LSOR satisfies at least one of the plurality of target power outputs of the target power delivery profile throughout the time period; and during the time period, adjusting, by the controller, an ESS setpoint of an ESS inverter coupled to the CSPP ESS to achieve the determined CSPP ESS charge/discharge.

13. The method of claim 12, wherein receiving the data associated with the power output of the LSOR comprises receiving the data at different times during the time period, and wherein determining the estimated power output of the LSOR comprises determining the estimated power output at each of the different times based on the received data.

14. The method of claim 12, wherein receiving the data associated with the power output of the LSOR comprises receiving data associated with a plurality of LSORs, and wherein the data associated with the power outputs of the plurality of LSORs includes outputs measured by a real-time metering system at each LSOR of the plurality of LSORs, and wherein the controller is configured to aggregate the measured outputs to calculate the estimated power output of the plurality of LSORs, and wherein the output of the CSPP RES and the charge/discharge of the CSPP ESS are determined using the estimated power output of the plurality of LSORs.

15. The method of claim 13, wherein receiving the data associated with the power output of the LSOR comprises receiving data associated with a plurality of LSORs, and wherein the data associated with the power outputs of the plurality of LSORs includes irradiance data collected near the plurality of LSORs, the method further comprising calculating an expected power output for each LSOR of the plurality of LSORs based on the irradiance data and aggregating the expected power output for each LSOR to determine the estimated power output of the plurality of LSORs, and wherein the output of the CSPP RES and the charge/discharge of the CSPP ESS are determined using the estimated power output of the plurality of LSORs.

16. The method of claim 15, wherein calculating the expected power output for each LSOR of the plurality of LSORs based on the irradiance data comprises calculating an irradiance for each LSOR of the plurality of LSORs using the irradiance data and calculating the expected power output for each LSOR using the irradiance for each LSOR and a conversion efficiency of each LSOR.

17. The method of claim 12, wherein receiving the data associated with the power output of the LSOR comprises receiving data associated with a plurality of LSORs, and wherein the data associated with the power outputs of the plurality of LSORs includes historic output data of the plurality of LSORs and wherein the method further comprises calculating an expected power output for each LSOR of the plurality of LSORs based at least in part on the historic output data and aggregating the expected power output for each LSOR to determine the estimated power output of the plurality of LSORs, and wherein the output of the CSPP RES and the charge/discharge of the CSPP ESS are determined using the estimated power output of the plurality of LSORs.

18. The method of claim 17, wherein calculating the expected power output for each LSOR of the plurality of LSORs based on the historic output data comprises:
    comparing current parameters of each LSOR of the plurality of LSORs to past parameters associated with the historic output data and generating a similarity score for each set of past parameters based on similarity to the current parameters of each LSOR;
    matching a set of past parameters to the current parameters based on the set of past parameters satisfying a similarity threshold; and
    setting the expected power output for each LSOR to a past power output associated with the matching set of past parameters.

19. The method of claim 13, wherein receiving the data associated with the power output of the LSOR comprises receiving data associated with a plurality of LSORs, and wherein the data associated with the power outputs of the plurality of LSORs includes outputs measured at a subset of the plurality of LSORs that each include a real-time metering system, and wherein the method further comprises:
    comparing characteristics of the subset of the plurality of LSORs to each of the plurality of LSORs not of the subset that do not include a real-time metering system;
    calculating outputs for each of the plurality of LSORs not of the subset based on the compared characteristics; and
    calculating the estimated power output of the plurality of LSORs using the measured outputs of the subset and the calculated outputs of the plurality of LSORs not of the subset, wherein the output of the CSPP RES and the charge/discharge of the CSPP ESS are determined using the estimated power output of the plurality of LSORs.

* * * * *